US011643352B2

(12) United States Patent
Kuppe et al.

(10) Patent No.: US 11,643,352 B2
(45) Date of Patent: May 9, 2023

(54) METHOD FOR MANUFACTURING AN OPTICAL ELEMENT OUT OF GLASS

(71) Applicant: DOCTER OPTICS SE, Neustadt an der Orla (DE)

(72) Inventors: Alexander Kuppe, Neustadt an der Orla (DE); Peter Mühle, Neustadt an der Orla (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 299 days.

(21) Appl. No.: 16/865,951

(22) Filed: May 4, 2020

(65) Prior Publication Data

US 2020/0346964 A1 Nov. 5, 2020

(30) Foreign Application Priority Data

May 3, 2019 (DE) ..................... 10 2019 111 579.5
Jul. 13, 2019 (DE) ..................... 10 2019 119 042.8
Sep. 20, 2019 (DE) ..................... 10 2019 125 337.3
Oct. 23, 2019 (DE) ..................... 10 2019 128 689.1

(Continued)

(51) Int. Cl.
*C03B 11/00* (2006.01)
*F21S 41/29* (2018.01)
(Continued)

(52) U.S. Cl.
CPC .............. *C03B 11/00* (2013.01); *B60Q 1/04* (2013.01); *C03B 11/08* (2013.01); *C03B 11/082* (2013.01); *C03B 29/02* (2013.01); *C03C 3/087* (2013.01); *F21S 41/25* (2018.01); *F21S 41/29* (2018.01); *C03B 2215/414* (2013.01);

(Continued)

(58) Field of Classification Search
None
See application file for complete search history.

(56) References Cited

U.S. PATENT DOCUMENTS 4,796,171 A 1/1989 Lindae
5,114,338 A * 5/1992 Tsuchiya ............. C03B 37/0146
432/208

(Continued)

FOREIGN PATENT DOCUMENTS

CN 108609838 A * 10/2018 ......... C03B 23/0086
DE 1099964 2/1961

(Continued)

OTHER PUBLICATIONS

CN 108609838 machine translation, He et al., Optical compression molding softening furnace for optical glass component, Oct. 2018 (Year: 2018).*

(Continued)

*Primary Examiner* — Queenie S Dehghan
(74) *Attorney, Agent, or Firm* — Barnes & Thornburg, LLP

(57) ABSTRACT

A method for manufacturing an optical element out of glass comprises placing a blank made of glass on an annular contact face of a supporting body having a hollow cross section. The blank is heated on the supporting body in a cavity of a protective cap that is arranged in a furnace cavity, such that a temperature gradient is established in the blank in such a way that the blank is cooler inside than on an outside region. The blank is press molded to form the optical element.

21 Claims, 27 Drawing Sheets

(30) Foreign Application Priority Data

Nov. 28, 2019 (DE) .................... 10 2019 132 406.8
Apr. 1, 2020 (DE) .................... 10 2020 109 123.0

(51) Int. Cl.

| | | |
|---|---|---|
| F21S 41/25 | (2018.01) | |
| B60Q 1/04 | (2006.01) | |
| C03B 11/08 | (2006.01) | |
| C03B 29/02 | (2006.01) | |
| C03C 3/087 | (2006.01) | |

(52) U.S. Cl.
CPC ...... C03B 2215/49 (2013.01); C03B 2215/50 (2013.01); C03B 2215/66 (2013.01)

(56) References Cited

U.S. PATENT DOCUMENTS

| | | | |
|---|---|---|---|
| 6,130,777 A | 10/2000 | Yamashita | |
| 7,139,133 B2 | 11/2006 | Bonitz | |
| 9,290,402 B2 | 3/2016 | Mühle | |
| 2001/0033726 A1 | 10/2001 | Shie | |
| 2007/0141349 A1 | 6/2007 | Hessenkemper | |
| 2008/0068852 A1* | 3/2008 | Goihl | F21S 41/151 362/311.06 |
| 2010/0206007 A1* | 8/2010 | Goldammer | C03B 19/025 65/102 |
| 2015/0224725 A1* | 8/2015 | Muhle | F21S 41/255 264/1.7 |

FOREIGN PATENT DOCUMENTS

| | | | | |
|---|---|---|---|---|
| DE | 3602262 | C2 | 5/1987 | |
| DE | 4031352 | A1 | 4/1992 | |
| DE | 29914114 | U1 | 11/1999 | |
| DE | 10100515 | A1 | 7/2002 | |
| DE | 10116139 | A1 | 10/2002 | |
| DE | 10226471 | B4 | 1/2004 | |
| DE | 10319708 | A1 | 11/2004 | |
| DE | 102005009556 | | 9/2005 | |
| DE | 112008003157 | B4 | 8/2010 | |
| DE | 102011114636 | A1 | 4/2013 | |
| EP | 1099964 | B1 | 5/2001 | |
| JP | 10123307 | A | 5/1998 | |
| JP | 2001147403 | A | 5/2001 | |
| JP | 2003048728 | A | 2/2003 | |
| JP | 2004210615 | A * | 7/2004 | C03B 37/0146 |
| WO | 2007095895 | A1 | 8/2007 | |
| WO | 2009109209 | A1 | 9/2009 | |
| WO | 2012072187 | A2 | 6/2012 | |
| WO | 2012072188 | A1 | 6/2012 | |
| WO | 2012072189 | A2 | 6/2012 | |
| WO | 2012072190 | A2 | 6/2012 | |
| WO | 2012072191 | A2 | 6/2012 | |
| WO | 2012072192 | A1 | 6/2012 | |
| WO | 2012072193 | A2 | 6/2012 | |
| WO | 2012130352 | A1 | 10/2012 | |
| WO | 2013068053 | A1 | 5/2013 | |
| WO | 2013068063 | A1 | 5/2013 | |
| WO | 2013123954 | A1 | 8/2013 | |
| WO | 2013135259 | A1 | 9/2013 | |
| WO | 2013159847 | A1 | 10/2013 | |
| WO | 2013170923 | A1 | 11/2013 | |
| WO | 2013178311 | A1 | 12/2013 | |
| WO | 2014072003 | A1 | 5/2014 | |
| WO | 2014114307 | A1 | 7/2014 | |
| WO | 2014114308 | A1 | 7/2014 | |
| WO | 2014114309 | A1 | 7/2014 | |
| WO | 2014131426 | A1 | 9/2014 | |
| WO | 2015031925 | A1 | 3/2015 | |
| WO | 2017059945 | A1 | 4/2017 | |
| WO | 2017215775 | A1 | 12/2017 | |

OTHER PUBLICATIONS

JP 2004210615 machine translation, Tanada Haruyoshi, Method and Apparatus for Manufacturing Glass preform, Jul. 2004 (Year: 2004).*

"Werkstoffkunde Glas" ["Materials science—Glass"], 1st edition, VEB Deutscher Verlag für Grundstoffindustrie, Leipzig VLN 152-915/55/75, LSV 3014, Copy deadline: Jan. 9, 1974, Order No. 54107, e.g. p. 130, 15 pages.

"Glastechnik—BG 1/1—Werkstoff Glas", ["Glass technology—BG 1/1—material, glass"] VEB Deutscher Verlag für Grundstoffindustrie, Leipzig 1972, e.g. p. 61ff, 22 pages.

Bosch—Automotive Handbook, 9th edition, ISBN 978-1-119-03294-6, p. 1040.

Webpages web.archive.org/web/20150109234745/http://www.audi.de/content/de/brand/de/vorsprung_durch_technik/content/2013/08/Audi-A8-erstrahlt-in-neuem-Licht.html (retrieved on Sep. 5, 2019).

www.all-electronics.de/matrix-led-und-laserlicht-bietet-viele-vorteile/ (retrieved on Sep. 2, 2019), 12 pages.

* cited by examiner

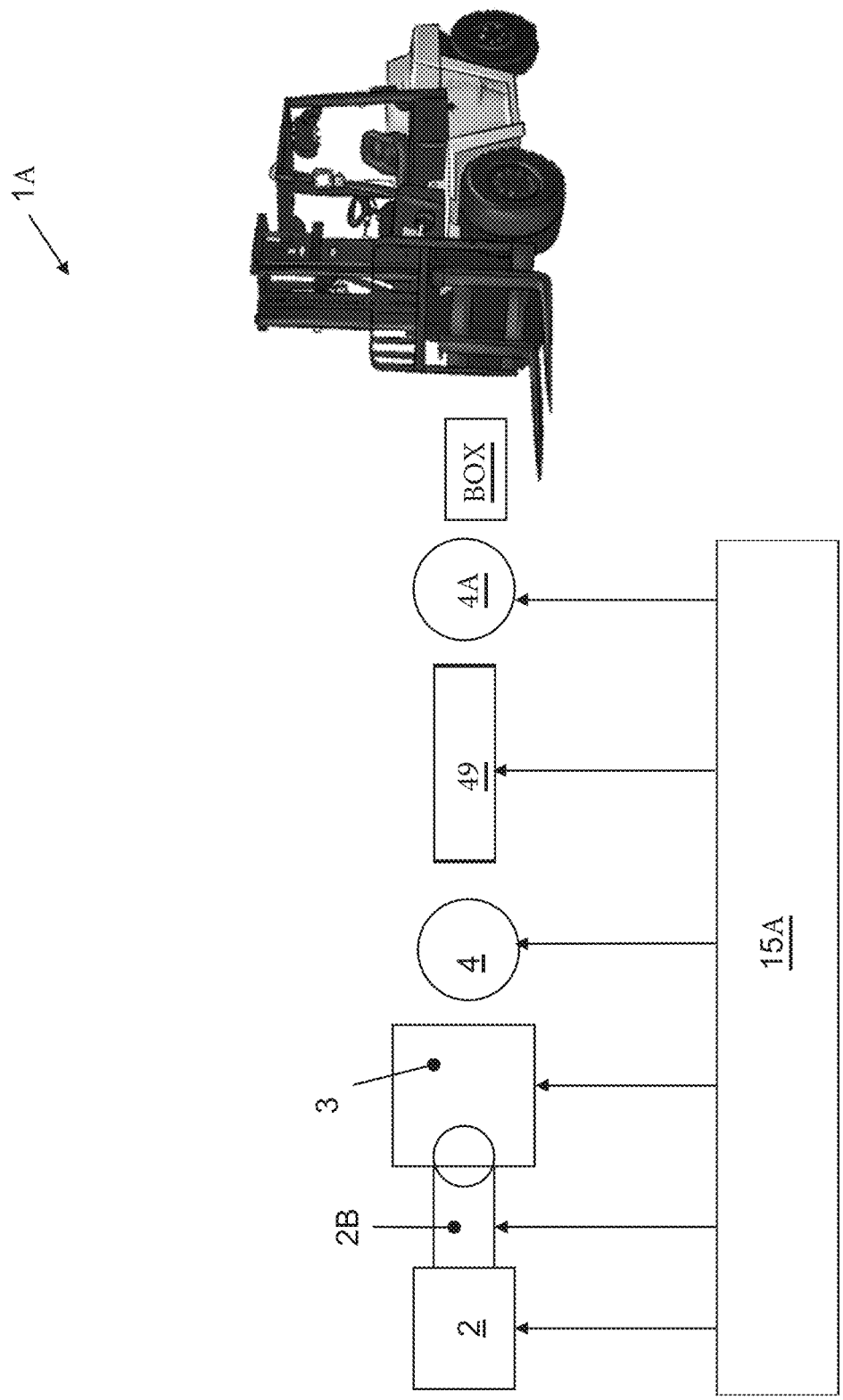

Fig. 11
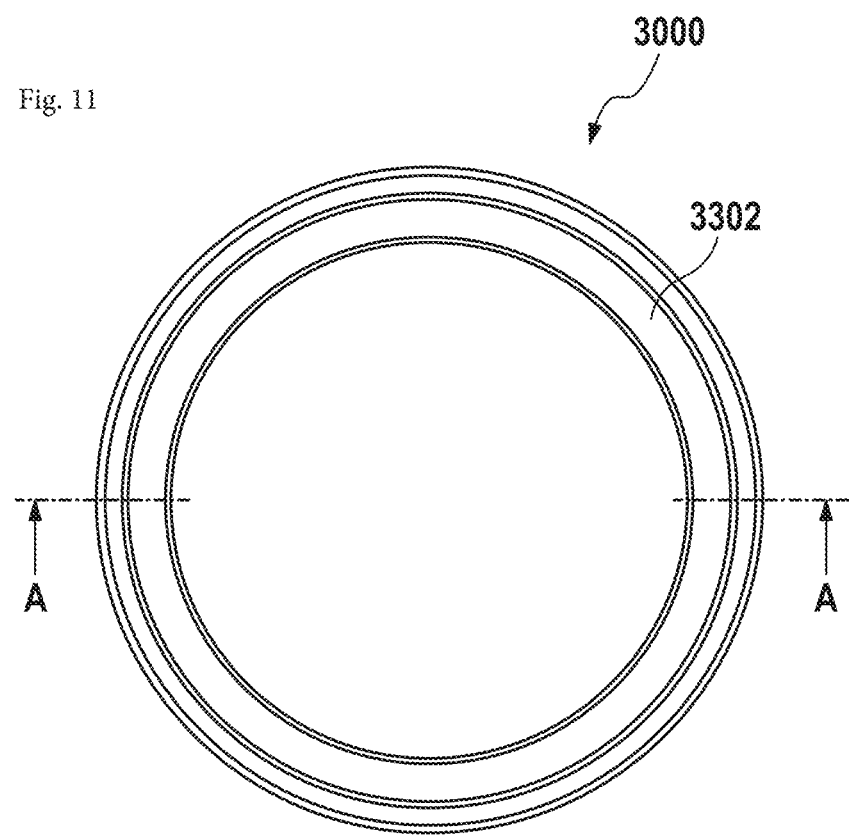
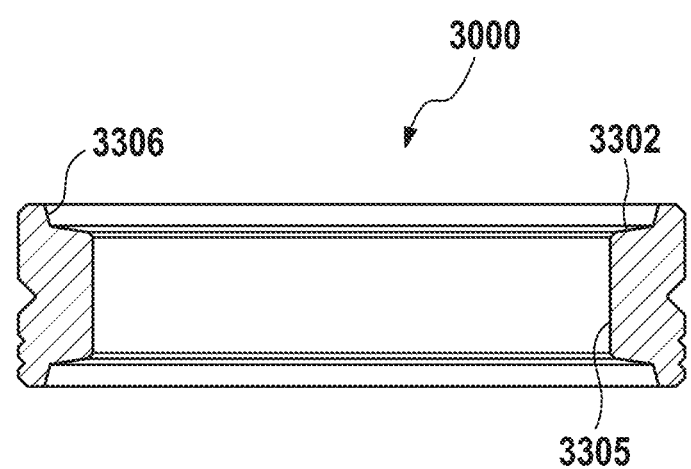
Fig. 12
A - A

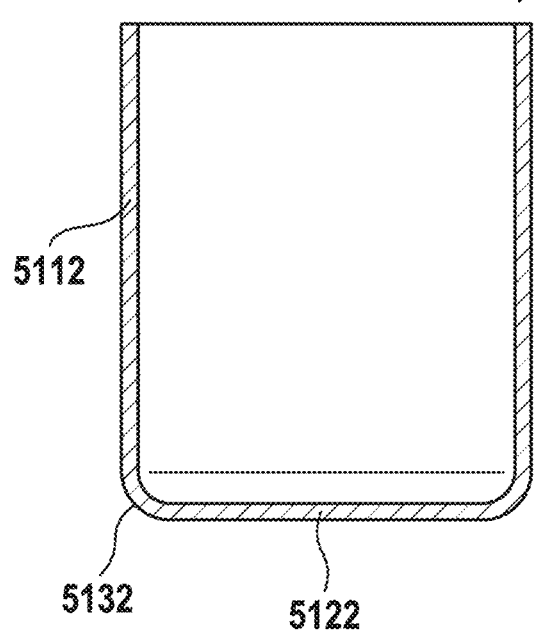
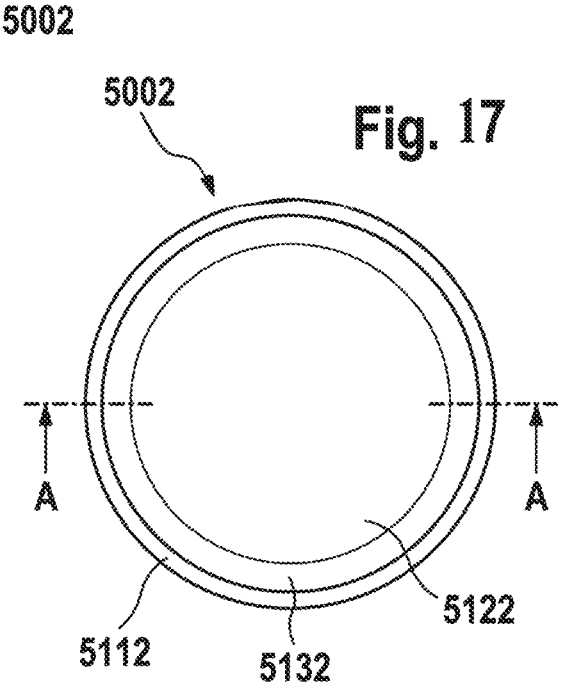
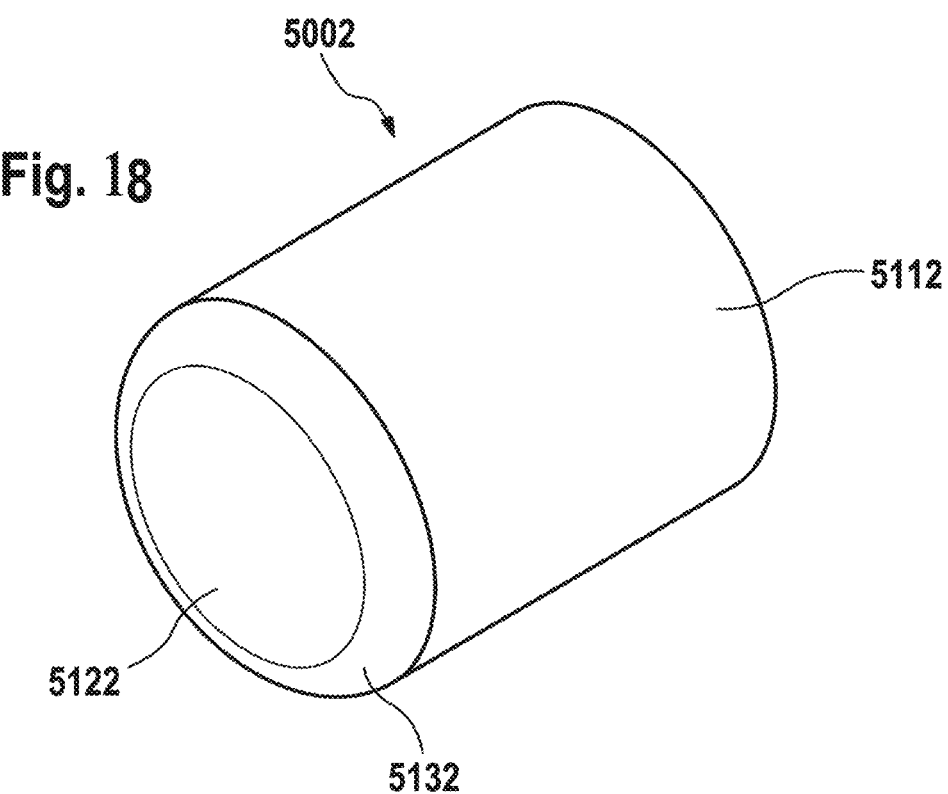

B - B

A - A

METHOD FOR MANUFACTURING AN OPTICAL ELEMENT OUT OF GLASS

PRIORITY CLAIM

This application claims priority DE 10 2019 111 579.5, filed May 3, 2019, DE 10 2019 119 042.8, filed Jul. 13, 2019, DE 10 2019 125 337.3, filed Sep. 20, 2019, DE 10 2019 128 689.1, filed Oct. 23, 2019, DE 10 2019 132 406.8, filed Nov. 28, 2019, and DE 10 2020 109 123.0, filed Apr. 1, 2020, each of which is expressly incorporated by reference herein.

BACKGROUND

The present disclosure relates to a method for manufacturing an optical element out of glass, wherein a portion of glass or a preform made of glass is press molded, for example on both sides, in order to form the optical element.

SUMMARY

According to the present disclosure, a method for manufacturing an optical element out of glass, wherein a blank made of glass, in connection with one or more of the following features, is press molded to form the optical element. Optical elements of this kind are used for example in headlight lenses. They can also be part of a multi-lens system of secondary optics used for depicting an illumination pattern generated by means of primary optics.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1A is a schematic view of a device for manufacturing gobs or optical elements, from glass;

FIG. 11 shows a further embodiment for a transport element;

FIG. 12 is a cross-sectional view of the transport element according to FIG. 11;

FIG. 16 is a cross section through the protective cap according to FIG. 14;

FIG. 17 is a view of the inside of the protective cap according to FIG. 14;

FIG. 18 is a perspective view of the protective cap according to FIG. 14;

DETAILED DESCRIPTION

Figure 1:
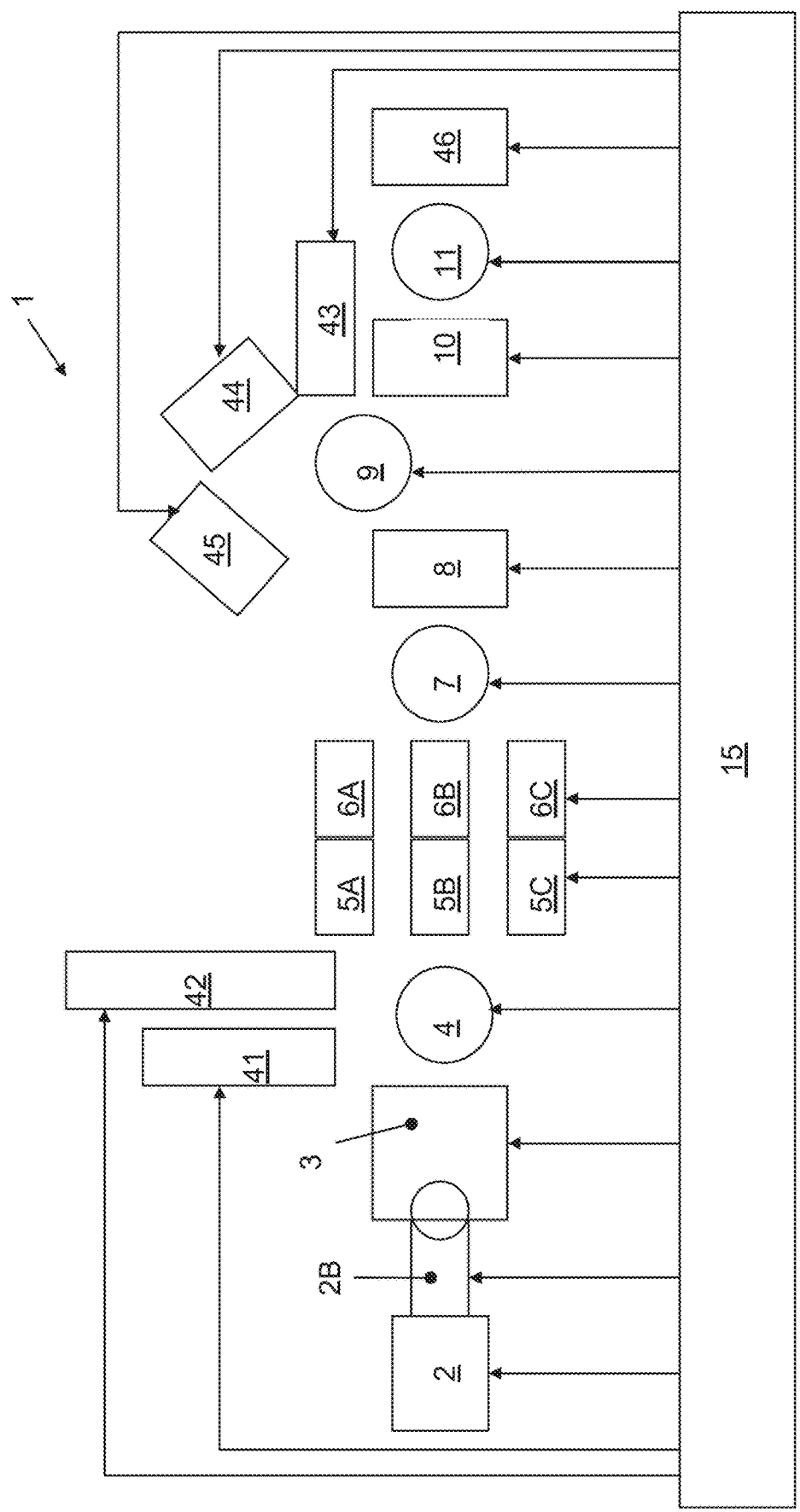
FIG. 1 is a schematic view of a device for manufacturing motor vehicle headlight lenses or lens-like freeforms for motor vehicle headlights or optical elements, from glass.

According to one embodiment, in order to manufacture an optical element out of glass, a blank made of glass is laid on a for example annular contact face (also freeform) of a supporting body, for example having a hollow cross section, and is heated on the supporting body, in a cavity of a protective cap that is arranged in a furnace cavity, for example such that a temperature gradient is established in the blank in such a way that the blank is cooler inside than in and/or on the surface region thereof, wherein following heating the glass blank is press molded, for example on both sides, to form the optical element.

In a further embodiment of the present disclosure, the protective cap is releasably arranged in the furnace cavity.

In a further embodiment of the present disclosure, the protective cap is removed following bursting of a or the blank out of the furnace cavity, wherein for example another protective cap is arranged in the furnace cavity.

In one embodiment, the blank is moved into the cavity of the protective cap from above or laterally. In a preferred embodiment of the present disclosure, however, the blank is moved into the cavity of the protective cap from below.

In a further embodiment of the present disclosure, the furnace cavity comprises at least one heating coil which surrounds the protective cap in the furnace cavity (at least) in part, wherein it is intended for the inside of the protective cap to be heated by means of the at least one heating coil.

In a further embodiment of the present disclosure, the furnace cavity comprises at least two heating coils which can be actuated independently of one another and which surround the protective cap in the furnace cavity at least in part, wherein the inside of the protective cap is heated by means of the at least two heating coils.

In a further embodiment of the present disclosure, the protective cap is produced from silicon carbide or comprises at least silicon carbide.

In a further embodiment of the present disclosure, the furnace cavity is part of a furnace cavity assembly, for example in the form of a carousel, comprising a plurality of furnace cavities, in each of which a protective cap is arranged. The quick exchangeability of the protective cap upon bursting of a blank not only reduces the downtime, which reduces costs, but also improves the quality of the optical component, since the quick replaceability reduces interfering effects when heating or warming the blanks. This effect can be further improved in that the opening of the cavity of the protective cap, which opening faces downwards, is closed or partially closed by a closure, wherein the closure can be detached or removed by releasing a fixing means, such as one or more screws. In this case it may be possible for the protective cap to fall out of the furnace cavity following the release or removal of the lower cover. In this manner, particularly quick restoration of a furnace or a top-hat furnace is ensured.

In a further embodiment of the present disclosure, the contact face is cooled by means of a cooling medium that flows through the supporting body. In a further embodiment of the present disclosure, the contact face spans a base surface that is not circular. In this case, for example a geometry of the contact face or a geometry of the base surface of the contact face is provided which corresponds to the geometry of the blank (which is to be heated), wherein the geometry is selected such that the blank rests on the outside region of the lower face thereof (lower face base surface). The diameter of the lower face or the lower face base surface of the blank is at least 1 mm larger than the diameter of the base surface (spanned by the supporting body or the contact face thereof).

In this context it is possible, for example, for the geometry of the surface of the blank which faces the supporting body, or the lower face base surface of the blank corresponds to the contact face or the base surface of the supporting body. This means, for example, that the part of the blank that rests on the supporting body or touches the supporting body during heating is arranged in an edge region of the headlight lens following the shaping process or following the molding or following the press molding, which edge region is outside of the optical path and rests for example on a transport element (see below) or the (corresponding) contact face thereof.

An annular contact face can comprise small interruptions. Within the meaning of this disclosure a base surface comprises, for example, an imaginary surface (in the region of which the blank lying on the supporting body is not in contact with the supporting body) which is located in the plane of the contact face and is surrounded by said contact face, and the (actual) contact face. It is possible, for example, for the blank and the supporting body to be matched to one another. This is intended to mean, for example, that edge region of the lower face of the blank rests on the supporting body. An edge region of a blank can for example be understood to be the outer 10% or the outer 5% of the blank or of the lower face thereof.

In one embodiment of the present disclosure, the base surface is polygon-shaped or polygonal, but for example having rounded corners, wherein it is also possible, for example, for the lower face base surface of the blank to be polygon-shaped or polygonal, but for example having rounded corners. In a further embodiment of the present disclosure, the base surface is triangle-shaped or triangular, but for example having rounded corners, wherein it is also possible, for example, for the lower face base surface of the blank to be triangle-shaped or triangular, but for example having rounded corners. In a further embodiment of the present disclosure, the base surface is rectangle-shaped or rectangular, but for example having rounded corners, wherein it is also possible, for example, for the lower face base surface of the blank to be rectangle-shaped or rectangular, but for example having rounded corners. In a further embodiment of the present disclosure, the base surface is square, but for example having rounded corners, wherein it is also possible, for example, for the lower face base surface of the blank to be square, but for example having rounded corners. In a further embodiment of the present disclosure, the base surface is oval, wherein it is also possible, for example, for the lower face base surface of the blank to be oval.

In a further embodiment of the present disclosure, the supporting body is designed so as to be tubular, at least in the region of the contact face. The supporting body consists (at least substantially) for example of steel or highly alloyed steel (i.e. for example a steel in which the average mass content of at least one alloy element is >5%), or of a tube of steel or highly alloyed steel. In a further embodiment of the present disclosure, the diameter of the hollow cross section of the supporting body or the tube inside diameter, at least in the region of the contact face, is no less than 0.5 mm and/or no greater than 1 mm. In a further embodiment of the present disclosure, the outside diameter of the supporting body or the tube outside diameter, at least in the region of the contact face, is no less than 2 mm and/or no greater than 4 mm, for example no greater than 3 mm. In a further embodiment of the present disclosure, the radius of curvature of the contact face, orthogonal to the flow direction of the coolant, is no less than 1 mm and/or no greater than 2 mm, for example no greater than 1.5 mm. In a further embodiment of the present disclosure, the ratio of the diameter of the hollow cross section of the supporting body, at least in the region of the contact face, to the outside diameter of the supporting body, at least in the region of the contact face, is no less than ¼ mm and/or no greater than ½. In a further embodiment of the present disclosure, the supporting body is uncoated, at least in the region of the contact face. In a further embodiment of the present disclosure, coolant flows through the supporting body in the counter-current principle. In a further embodiment of the present disclosure, the coolant is additionally or actively heated. In a further embodiment of the present disclosure, the supporting body comprises at least two flow channels for the cooling medium flowing through, which channels in each case extend over only a portion of the annular contact face, wherein it is possible, for example, for two flow channels to be connected by means of a metal filling material, for example a solder agent, in a region in which they leave the contact face.

Within the meaning of this disclosure, a blank is for example a portioned glass part or a preform or a gob.

The described method can also be carried out in connection with molding under vacuum, or almost vacuum, or at least low pressure. Low pressure within the meaning of this disclosure is for example a pressure that is no greater than 0.1 bar, for example no greater than 0.05 bar, for example no greater than 0.01 bar. Suitable methods are disclosed for example in JP 2003-048728 A (incorporated by reference in its entirety) and in WO 2014/131426 A1 (incorporated by reference in its entirety). In a corresponding design, a bellows may be provided, as is disclosed at least in a similar manner in WO 2014/131426 A1. It may be possible for molding of an optical element to be achieved by means of at least one lower mold and at least one upper mold, wherein a heated blank made of transparent material is placed in or on the lower mold, wherein (subsequently or thereafter) the upper mold and the lower mold are (positioned relative to one another and) moved towards one another, without the upper mold and the lower mold forming a closed overall mold, wherein (subsequently or thereafter) a seal for creating an air-tight space, in which the upper mold and the lower mold are arranged, is closed, wherein (subsequently or thereafter), a low pressure is generated in the air-tight space, and wherein (subsequently or thereafter) the upper mold and the lower mold are moved towards one another (for example vertically), for the purpose of (press) molding of the optical lens element (for example on both or on all sides), wherein it is intended, for example, that the upper mold and the lower mold form a closed overall mold.

The upper mold and the lower mold can be moved towards one another by means of the upper mold being moved (vertically) towards the lower mold, and/or the lower mold towards the upper mold.

For the purpose of molding, the upper mold and the lower mold are moved towards one another for example until they touch or form a closed overall mold.

In one embodiment of the present disclosure, in step (b) the upper mold and the lower mold are moved together for example to such an extent that the spacing (for example the vertical spacing) between the upper mold and the blank is no less than 4 mm and/or no more than 10 mm.

In a further embodiment of the present disclosure (subsequent to step (e) or after step (e)), normal pressure is generated in the air-tight space.

Within the meaning of this disclosure, normal pressure is for example atmospheric (air) pressure. Within the meaning of this disclosure, normal pressure is for example the pressure or air pressure prevailing outside the seal. Subsequently or thereafter, in a further embodiment of the present disclosure the seal is opened or moved back into the initial position thereof.

In a further embodiment of the present disclosure, (subsequently or thereafter or during step (f)), the upper mold and the lower mold are moved apart from one another.

The upper mold and the lower mold can be moved apart from one another by means of the upper mold being moved away from the lower mold, and/or the lower mold being moved away from the upper mold. Subsequently or thereafter, in a further embodiment of the present disclosure the optical element is removed. Subsequently or thereafter, in a further embodiment of the present disclosure the optical element is cooled according to a predetermined cooling regime (see below).

In a further embodiment of the present disclosure, prior to molding of the optical lens element (or between step (d) and step (e)) waiting occurs for a predetermined waiting time. In a further embodiment of the present disclosure, the predetermined waiting time is no more than 3 s (minus the duration of step (d)). In a further embodiment of the present disclosure, the predetermined waiting time is no less than is (minus the duration of step (d)).

According to a further embodiment of the present disclosure, the optical element is placed on a transport element following press molding and passes through a cooling path, together with the transport element, without an optical surface of the optical element being touched. Within the meaning of this disclosure, a cooling path (for example for cooling optical elements) is used for example for controlled cooling of the optical element (for example while adding heat). Cooling regimes by way of example can be found for example in "Werkstoffkunde Glas" ["*Materials science—Glass*"], 1st edition, VEB Deutscher Verlag für Grundstoffindustrie, Leipzig VLN 152-915/55/75, LSV 3014, Copy deadline: 1.9.1974, Order number: 54107, e.g. page 130, and "Glastechnik—BG 1/1—Werkstoff Glas", ["*Glass technology—BG 1/1—material, glass*"] VEB Deutscher Verlag für Grundstoffindustrie, Leipzig 1972, e.g. pages 61ff (incorporated by reference in its entirety).

The transport element or the corresponding contact face of the transport element is for example annular but for example not circular. In one embodiment, the corresponding contact face surrounds a recess having a passage surface, which is for example the surface that forms the recess in a plan view of the transport element. The geometrical shape of the passage surface corresponds for example approximately or substantially to the geometrical shape of the base surface. In one embodiment of the present disclosure, the passage surface is polygon-shaped or polygonal, but for example having rounded corners. In a further embodiment of the present disclosure, the base surface is triangle-shaped or triangular, but for example having rounded corners. In a further embodiment of the present disclosure, the base surface is rectangle-shaped or rectangular, but for example having rounded corners. In a further embodiment of the present disclosure, the base surface is square, but for example having rounded corners. In a further embodiment of the present disclosure, the base surface is oval.

Within the meaning of this disclosure, glass is for example inorganic glass. Within the meaning of this disclosure, glass is for example silicate glass. Within the meaning of this disclosure, glass is for example as is described in WO 2009/109209 A1. Within the meaning of this disclosure, glass comprises for example 0.2 to 2 wt. % a $Al_2O_3$, 0.1 to 1 wt. % a $Li_2O$,
0.3, for example 0.4, to 1.5 wt. % $Sb_2O_3$,
60 to 75 wt. % $SiO_2$,
3 to 12 wt. % $Na_2O$,
3 to 12 wt. % $K_2O$ and
3 to 12 wt. % CaO,
such as DOCTAN®.

In addition to requirements for particular contour accuracy and precise optical properties, the desire has emerged to mold headlight lenses from borosilicate glass or glass systems similar to borosilicate glass, in order to achieve increased weather resistance and/or hydrolytic resistance (chemical resistance). Norms or assessment methods with respect to hydrolytic resistance (chemical resistance) are for example the Hella norm test N67057 and the climate test/moisture-frost test. High hydrolytic resistance is also classified as type 1 for example. In the light of the demand for borosilicate glass headlight lenses having corresponding hydrolytic resistance, the object is that of molding headlight lenses from borosilicate glass or similar glass systems having the same hydrolytic resistance (chemical resistance). In a departure from this object, an alternative method for manufacturing an optical element or a headlight lens is proposed, wherein a blank of non-borosilicate glass and/or of soda lime glass (soda lime silica glass) is heated and/or provided and, following heating and/or provision, is press molded, for example on both sides, between a first mold, for example for mold and/or press molding a first optically active surface of the optical element, and at least one second mold, for example for molding and/or for press molding a second optically active surface of the optical element, wherein the first optically active surface and/or the second optically active surface (following molding) is sprayed with a surface treatment agent.

Within the meaning of this disclosure, spraying and/or sprinkling comprises for example atomizing, misting and/or (the use of or the application of) spray mist. Within the meaning of this disclosure, spraying and/or sprinkling means for example atomizing, misting and/or (the use of or the application of) spray mist.

Within the meaning of this disclosure, soda lime glass comprises for example
60 to 75 wt. % $SiO_2$, and
3 to 12 wt. % CaO,
or
70 to 75 wt. % $SiO_2$, and
3 to 12 wt. % CaO.

Within the meaning of this disclosure, soda lime glass comprises for example
60 to 75 wt. % $SiO_2$,
3 to 12 wt. % $K_2O$ and
3 to 12 wt. % CaO,
or
70 to 75 wt. % $SiO_2$,
3 to 12 wt. % $K_2O$ and
3 to 12 wt. % CaO.

Within the meaning of this disclosure, soda lime glass comprises for example
60 to 75 wt. % $SiO_2$,
3 to 12 wt. % $Na_2O$,
3 to 12 wt. % $K_2O$ and
3 to 12 wt. % CaO,
or
70 to 75 wt. % $SiO_2$,
3 to 12 wt. % $Na_2O$,
3 to 12 wt. % $K_2O$ and
3 to 12 wt. % CaO.

Within the meaning of this disclosure, soda lime glass comprises for example
0.2 to 2 wt. % $Al_2O_3$,
60 to 75 wt. % $SiO_2$,
3 to 12 wt. % $Na_2O$,
3 to 12 wt. % $K_2O$ and
3 to 12 wt. % CaO, Within the meaning of this disclosure, soda lime glass comprises for example
0.2 to 2 wt. % $Al_2O_3$,
0.1 to 1 wt. % $Li_2O$,
60 to 75 wt. % $SiO_2$,
3 to 12 wt. % $Na_2O$,
3 to 12 wt. % $K_2O$ and
3 to 12 wt. % CaO,
or
0.2 to 2 wt. % $Al_2O_3$,
0.1 to 1 wt. % $Li_2O$,
70 to 75 wt. % $SiO_2$,
3 to 12 wt. % $Na_2O$,
3 to 12 wt. % $K_2O$ and
3 to 12 wt. % CaO, Within the meaning of this disclosure, soda lime glass comprises for example
0.2 to 2 wt. % $Al_2O_3$,
0.1 to 1 wt. % $Li_2O$,
0.3, for example 0.4, to 1.5 wt. % $Sb_2O_3$,
60 to 75 wt. % $SiO_2$,
3 to 12 wt. % $Na_2O$,
3 to 12 wt. % $K_2O$ and
3 to 12 wt. % CaO,
such as DOCTAN®, or
0.2 to 2 wt. % $Al_2O_3$,
0.1 to 1 wt. % $Li_2O$,
0.3, for example 0.4, to 1.5 wt. % $Sb_2O_3$,
70 to 75 wt. % $SiO_2$,
3 to 12 wt. % $Na_2O$,
3 to 12 wt. % $K_2O$ and
3 to 12 wt. % CaO.

The surface treatment agent comprises for example $AlCl_3 * 6H_2O$ (dissolved in a solvent and/or $H_2O$), wherein suitable mixing ratios can be found in DE 103 19 708 A1 (e.g. FIG. 1). For example at least 0.5 g, for example at least 1 g $AlCl_3 * 6H_2O$ per liter $H_2O$ is provided.

In one embodiment of the present disclosure, the first optically active surface and the second optically active surface are sprayed with the surface treatment agent simultaneously (temporally overlapping) at least in part.

In a further embodiment of the present disclosure the temperature of the optical element and/or the temperature of the first optically active surface and/or the temperature of the second optically active surface during spraying with the surface treatment agent is no less than $T_G$ or $T_G+20K$, wherein $T_G$ is the glass transition temperature.

In a further embodiment of the present disclosure the temperature of the optical element and/or the temperature of the first optically active surface and/or the temperature of the second optically active surface during spraying with the surface treatment agent is no greater than $T_G$ or $T_G+100K$.

In a further embodiment of the present disclosure, the surface treatment agent is sprayed onto the optically active surface as a spray, wherein the surface treatment agent forms droplets, the size and/or average size of which, and/or the diameter and/or average diameter of which is no greater than 50 μm.

In a further embodiment of the present disclosure, the surface treatment agent is sprayed onto the optically active surface as a spray, wherein the surface treatment agent forms droplets, the size and/or average size of which, and/or the diameter and/or average diameter of which is no smaller than 10 μm.

In a further embodiment of the present disclosure, the surface treatment agent is sprayed in a manner mixed with compressed air. In one embodiment of the present disclosure, in order to generate a spray mist for the surface treatment agent, compressed air, for example in conjunction with a mixing nozzle or a two-fluid nozzle is used.

In a further embodiment of the present disclosure, the optically active surface is sprayed with the surface treatment agent prior to cooling of the optical element in a cooling stretch for cooling according to a cooling regime.

In a further embodiment of the present disclosure, an optically active surface is sprayed with the surface treatment agent for no longer than 4 seconds. In this case, an optically active surface is sprayed with the surface treatment agent for example for no longer than 3 seconds, for example for no longer than 2 seconds, for example for no longer than 1 second. In this case, spraying is carried out for example until the optically active surface is sprayed with no less than 0.05 ml surface treatment agent and/or no more than 0.5 ml, for example 0.2 ml, surface treatment agent.

It is possible, for example, for the headlight lens or a headlight lens according to the present disclosure to consist, at the surface, of at least 90%, for example at least 95%, for example (substantially) up to 100% quartz glass following spraying with the surface treatment agent. It is possible, for example, for the following to apply with respect to the oxygen binding to silicon at the surface of the headlight lens or of the optical element:

$$\frac{Q(4)}{Q(4)+Q(3)} \geq 0.9$$

for example $$\frac{Q(4)}{Q(4)+Q(3)} \geq 0.95$$

The quartz glass portion decreases towards the inside of the headlight lens or of the optical element, wherein it is possible, for example, at a depth (spacing from the surface) of 5 μm, for the quartz glass portion to be at least 10%, for example at least 5%. It is possible, for example, for the following to apply with respect to the oxygen binding to silicon of the headlight lens or of the optical element at a depth of 5 μm $$\frac{Q(4)}{Q(4)+Q(3)} \geq 0.1$$

for example $$\frac{Q(4)}{Q(4)+Q(3)} \geq 0.05$$

It is possible, for example, for the quartz glass portion to be no more than 50%, for example no more than 25%, at a depth (spacing from the surface) of 5 μm. It is possible, for example, for the following to apply with respect to the oxygen binding to silicon of the headlight lens or of the optical element at a depth of 5 μm $$\frac{Q(4)}{Q(4)+Q(3)} \leq 0.5$$

for example $$\frac{Q(4)}{Q(4)+Q(3)} \leq 0.25$$

In a further embodiment of the present disclosure, the first mold is displaced by means of an actuator for displacing the first mold, in that the first mold and the actuator are connected by means of a first displaceable guide rod and at least one second displaceable guide rod, for example at least one third displaceable guide rod, wherein the first displaceable guide rod is guided in a recess of a fixed guide element, and the second displaceable guide rod is guided in a recess of the fixed guide element, and the optional third displaceable guide rod is guided in a recess of the fixed guide element, wherein it is possible, for example, for the deviation of the position of the mold orthogonally to the displacement direction of the mold to be no more than 20 μm, for example no more than 15 μm, for example no more than 10 μm, from the target position of the mold, orthogonally to the displacement direction of the mold.

In a further embodiment of the present disclosure, the at least second mold is displaced by means of an actuator for moving the second mold in a frame comprising a first fixed guide rod, at least one second fixed guide rod, and for example at least one third guide rod, wherein the first fixed guide rod, the at least second fixed guide rod and the optional at least third fixed guide rod are connected, at one end, by means of a connecting piece fixed on the actuator side and, on the other side, by a connecting piece fixed on the mold side, wherein the at least second mold is fixed to a displaceable guide element that comprises a recess through which the first fixed guide rod is guided, a further recess through which the at least second first guide rod is guided, and optionally a further recess through which the optional third fixed guide rod is guided, wherein it is possible, for example, for the deviation in the position of the mold orthogonally to the displacement direction of the mold to be no more than 20 μm, for example no more than 15 μm, for example no more than 10 μm, from the target position of the mold orthogonally to the displacement direction of the mold.

In one embodiment of the present disclosure it is possible, for example, for the first mold to be displaced by means of an actuator for displacing the first mold, in that the first mold and the actuator for displacing the first mold are connected by means of a first displaceable guide rod and at least one second displaceable guide rod, for example at least one third displaceable guide rod, wherein the first displaceable guide rod is guided in a recess of a fixed guide element, and the second displaceable guide rod is guided in a recess of the fixed guide element, and the optional third displaceable guide rod is guided in a recess of the fixed guide element.

According to a further embodiment of the present disclosure, the fixed guide element, just like the fixed connecting piece on the mold side, is directly or indirectly fixed thereto.

In a further embodiment of the present disclosure, the first mold is a lower mold and/or the second mold is an upper mold.

Within the meaning of this disclosure, an optical element is for example a lens, for example a headlight lens or a lens-like freeform. Within the meaning of this disclosure, an optical element is for example a lens or a lens-like freeform having a for example peripheral, interrupted, or interrupted peripheral support edge. An optical element within the meaning of this disclosure can for example be an optical element as is described for example in WO 2017/059945 A1, WO 2014/114309 A1, WO 2014/114308 A1, WO 2014/114307 A1, WO 2014/072003 A1, WO 2013/178311 A1, WO 2013/170923 A1, WO 2013/159847 A1, WO 2013/123954 A1, WO 2013/135259 A1, WO 2013/068063 A1, WO 2013/068053 A1, WO 2012/130352 A1, WO 2012/072187 A2, WO 2012/072188 A1, WO 2012/072189 A2, WO 2012/072190 A2, WO 2012/072191 A2, WO 2012/072192 A1, WO 2012/072193 A2, PCT/EP2017/000444. Each of said documents is incorporated by reference in its entirety.

The claimed method is used for example in non-symmetrical headlight lenses or in non-rotationally symmetrical headlight lenses. The claimed method is used for example in headlight lenses having non-symmetrical contours or non-rotationally symmetrical headlight contours. The claimed method is used for example in headlight lenses or in non-rotationally symmetrical headlight lenses having deterministic surface structures, as disclosed for example in WO 2015/031925 A1, and for example having deterministic non-periodic surface structures, as disclosed for example in DE 10 2011 114 636 A1.

According to a further embodiment of the present disclosure, the optical element is placed on a transport element following press molding, is sprayed with surface treatment agent on the transport element, and thereafter or subsequently passes through a cooling path, together with the transport element, without an optical surface of the optical element being touched (see above). Adherence to a cooling regime of this kind is necessary in order to prevent internal stresses within the optical element or the headlight lens which, although not visible upon visual examination, in part significantly impair the lighting properties, as an optical element, of a headlight lens. These impairments render a corresponding optical element or a corresponding headlight lens useless. It has surprisingly been found that although the spraying, according to the present disclosure, of the hot optical element or of the hot headlight lens after press molding or after demolding following press molding, changes the cooling regime, resulting optical stresses are negligible. It is also surprising that a corresponding headlight lens is within the optical tolerances specified above, with respect to the optical property thereof, although the refractive index is reduced by the quartz glass portion at the surface.

In one embodiment of the present disclosure, the transport element consists of steel. To clarify: The transport element is not part of the lens (or headlight lens), and/or the lens (or headlight lens) and the transport element are not part of a common integral body.

In a further embodiment of the present disclosure, the transport element is heated, for example inductively, before the optical element is received. In a further embodiment of the present disclosure, the transport element is heated at a heating rate of at least 20 K/s, for example of at least 30 K/s. In a further embodiment of the present disclosure, the transport element is heated at a heating rate of no more than 50 K/s. In a further embodiment of the present disclosure, the transport element is heated by means of a winding/coil through which a current flows and which is arranged above the transport element.

In a further embodiment of the present disclosure, the optical element comprises a contact face which is located outside of the intended light path for the optical element, wherein the contact face, for example only the contact face, is in contact with a corresponding contact face of the transport element, when the optical element is deposited on the transport element. In a further embodiment of the present disclosure, the contact face of the optical element is located on the edge of the optical element. In a further embodiment of the present disclosure, the transport element comprises at least one boundary surface for orienting the optical element on the transport element or for limiting or preventing a movement of the optical element on the transport element. In one embodiment, the boundary surface or a boundary surface is provided above the corresponding contact face of the transport element. In a further embodiment (at least) two boundary surfaces are provided, wherein it may be possible for one boundary surface to be located below the corresponding contact face of the transport element, and one boundary surface to be located above the corresponding contact face of the transport element. In a further embodiment of the present disclosure, the transport element is manufactured, for element milled, in a manner matched to the optical element or the contact face of the optical element.

The transport element or the contact face of the transport element is for example annular but for example not circular.

In a further embodiment of the present disclosure, the preform is manufactured, cast and/or shaped from molten glass. In a further embodiment of the present disclosure, the mass of the preform is 20 g to 400 g.

In a further embodiment of the present disclosure, the temperature gradient of the preform is set such that the temperature of the core of the preform is above $10\ K+T_G$.

In a further embodiment of the present disclosure, for the purpose of inverting the temperature gradient thereof, the preform is firstly cooled and subsequently heated, for example while adding heat, wherein it is possible, for example, for the preform to be heated such that the temperature of the surface of the preform following heating is at least 100K, for example at least 150K, higher than the transformation temperature $T_G$ of the glass. The transformation temperature $T_G$ of the glass is the temperature at which the glass becomes hard. Within the meaning of this disclosure, the transformation temperature $T_G$ of the glass is intended to be the temperature of the glass, for example, at which said glass has a log viscosity in a range around 13.2 (corresponds to $10^{13.2}$ Pa·s), for example between 13 (corresponds to $10^{13}$ Pa·s) and 14.5 (corresponds to $10^{14.5}$ Pa·s). With respect to the glass type B270, the transformation temperature $T_G$ is approximately 530° C.

In a further embodiment of the present disclosure, the temperature gradient of the preform is set such that the temperature of the upper surface of the preform is at least 30 K, for example at least 50 K, above the temperature of the lower surface of the preform. In a further embodiment of the present disclosure, the temperature gradient of the preform is set such that the temperature of the core of the preform is at least 50 K below the temperature of the surface of the preform. In a further embodiment of the present disclosure, the preform is cooled such that the temperature of the preform prior to heating is $T_G$-80 K to $T_G$+30 K. In a further embodiment of the present disclosure, the temperature gradient of the preform is set such that the temperature of the core of the preform is 450° C. to 550° C. The temperature gradient is for example set such that the temperature in the core of the preform is less than $T_G$ or close to $T_G$. In a further embodiment of the present disclosure, the temperature gradient of the preform is set such that the temperature of the surface of the preform is 700° C. to 900° C., for example 750° C. to 850° C. In a further embodiment of the present disclosure, the preform is heated such that the surface thereof (for example immediately before molding) assumes a temperature that corresponds to the temperature at which the glass of the preform has a log viscosity of between 5 (corresponds to $10^5$ Pa·s) and 8 (corresponds to $10^8$ Pa·s), for example a log viscosity of between 5.5 (corresponds to $10^{5.5}$ Pa·s) and 7 (corresponds to $10^7$ Pa·s).

It is possible, for example, for the preform to be removed prior to inverting the temperature gradient of a mold for shaping or manufacturing a preform. It is possible, for example, for the inversion of the temperature gradient to take place outside of a mold. Within the meaning of this disclosure, cooling while adding heat is intended to mean, for example, that cooling is carried out at a temperature of over 100° C.

Within the meaning of this disclosure, press molding is intended to mean, for example, molding a (for example optically active) surface such that subsequent post-processing of the contour of said (for example optically active) surface can be omitted or is omitted or is not provided. It is thus possible, for example, for a press molded surface not to be sanded following press molding. Polishing, which influences the surface finish but not the contour of the surface may be provided in some situations. Press molding on both sides is intended to mean, for example, that a (for example optically active) light exit surface is press molded, and a (for example optically active) light entry surface, for example opposite the (for example optically active) light exit surface, is likewise press molded.

In one embodiment, the blank is deposited on an annular contact face of a supporting body having a hollow cross section and is heated, on the supporting body, for example such that a temperature gradient is established in the blank in such a way that the blank is cooler on the inside than at the outer region thereof, wherein the contact face is cooled by means of a cooling medium flowing through the supporting body, wherein the glass blank is press molded, for example on both sides, following heating, to form the optical element, wherein the supporting body comprises at least two flow channels for the cooling medium flowing through, which channels in each case extend only over a portion of the annular contact face, and wherein two flow channels are connected by means of a metal filler material, for example a solder agent, in a region in which they leave the contact face.

Within the meaning of this disclosure, a guide rod may be a rod, a tube, a profile, or similar.

Within the meaning of this disclosure, fixed means for example directly or indirectly fixed to a foundation of the molding station or the mold, or a foundation on which the molding station or the mold is positioned. Within the meaning of this disclosure, two elements are fixed to one another for example if it is not intended, for the purpose of molding, for said elements to be moved relative to one another.

For the purpose of molding, the first and the second mold are moved towards one another for example such that they form a closed mold or cavity, or a substantially closed mold or cavity. Within the meaning of this disclosure, moving towards one another means, for example, that both molds are moved. It can also mean, however, that just one of the two molds is being moved.

Within the meaning of the disclosure, a recess comprises, for example, a bearing that couples or connects the recess to the corresponding guide rod. Within the meaning of this disclosure, a recess can be enlarged to form a sleeve or can be designed as a sleeve. Within the meaning of this disclosure, a recess can be enlarged to form a sleeve comprising an inner bearing or can be designed as a sleeve having an inner bearing.

In the case of a matrix headlight, the optical element or a corresponding headlight lens is used for example as attachment optics and/or as a secondary lens for imaging and/or one of the attachment optics. Within the meaning of this disclosure, an attachment optics is for example arranged between the secondary optics and the light source assembly. Within the meaning of this disclosure, an attachment optics is for example arranged in the light path between the secondary optics and the light source assembly. Within the meaning of this disclosure, an attachment optics is for example an optical component for shaping a light distribution depending on light that is generated by the light source assembly and is shone therefrom onto the attachment optics. In this case, a light distribution is generated or shaped for example by means of TIR, i.e. by means of total internal reflection.

The optical element according to the present disclosure or a corresponding lens is for example also used in a projection headlight. In the embodiment as a headlight lens for a projection headlight, the optical element or a corresponding headlight lens depicts the edge of a shield, as a cut-off line, on the carriageway.

Within the meaning of this disclosure, a motor vehicle is for example a land vehicle that can be used individually in road traffic. Within the meaning of this disclosure, motor vehicles are for example not restricted to land vehicles comprising internal combustion engines.

Figure 1B:
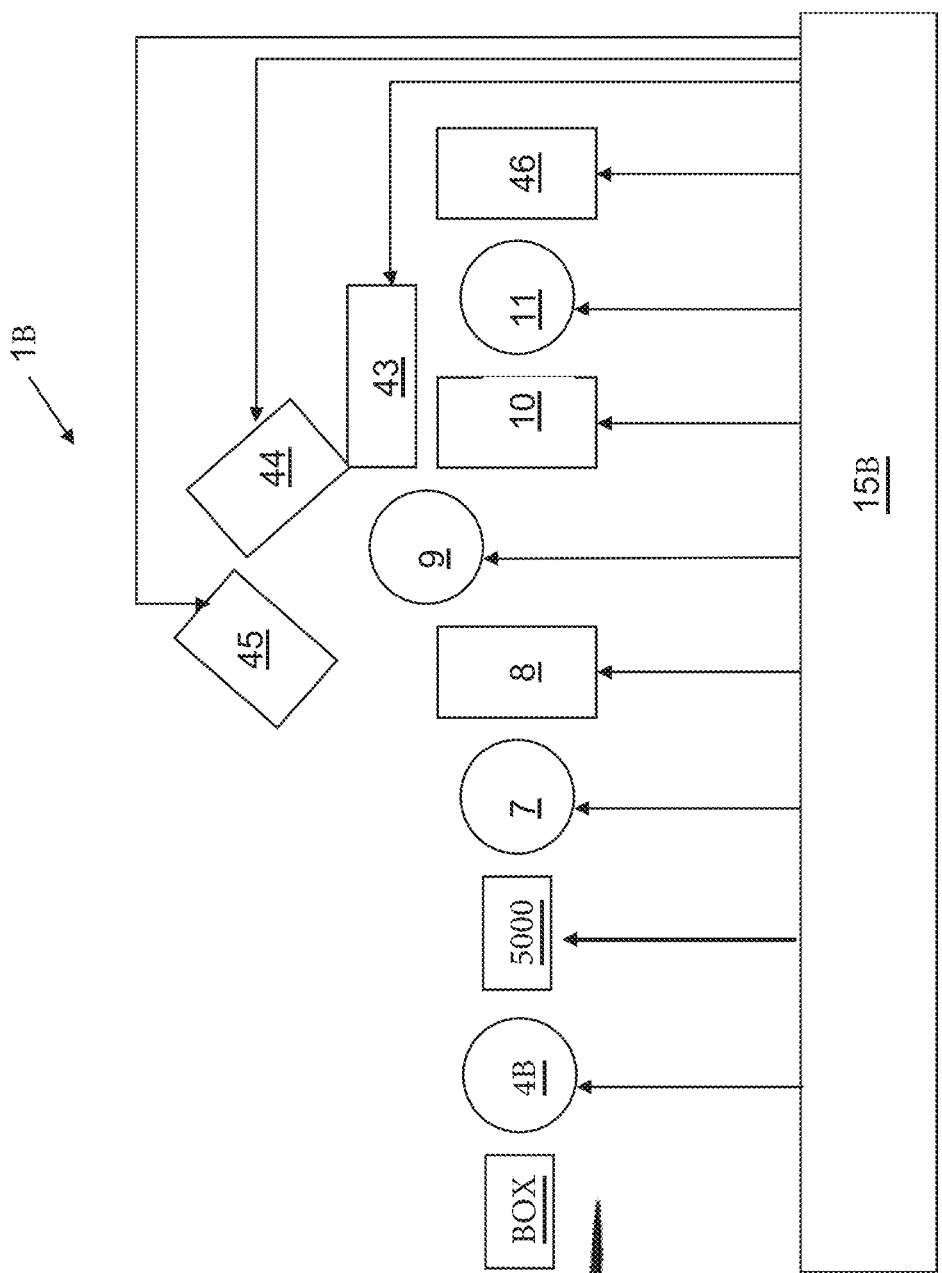
FIG. 1B is a schematic view of a device for manufacturing motor vehicle headlight lenses or lens-like freeforms for motor vehicle headlights or optical elements, from glass.
Figure 2A:
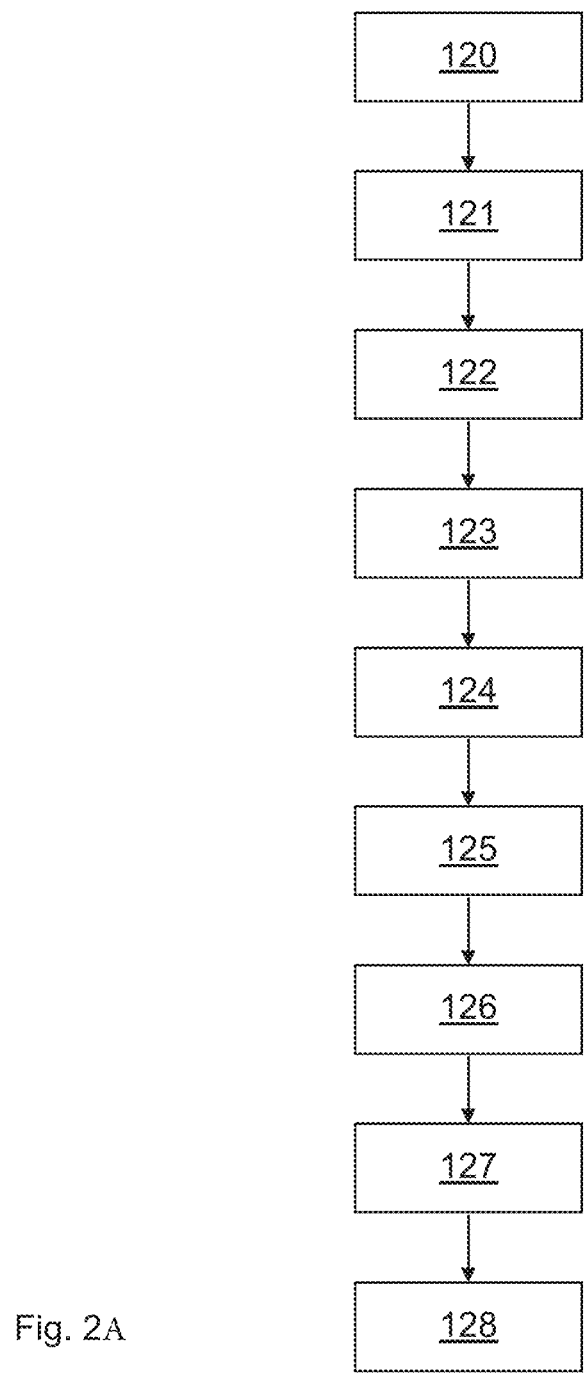
FIG. 2A shows a sequence, by way of example, of a method for manufacturing motor vehicle headlight lenses or lens-like freeforms for a motor vehicle headlight or optical elements, from glass.
Figure 2B:
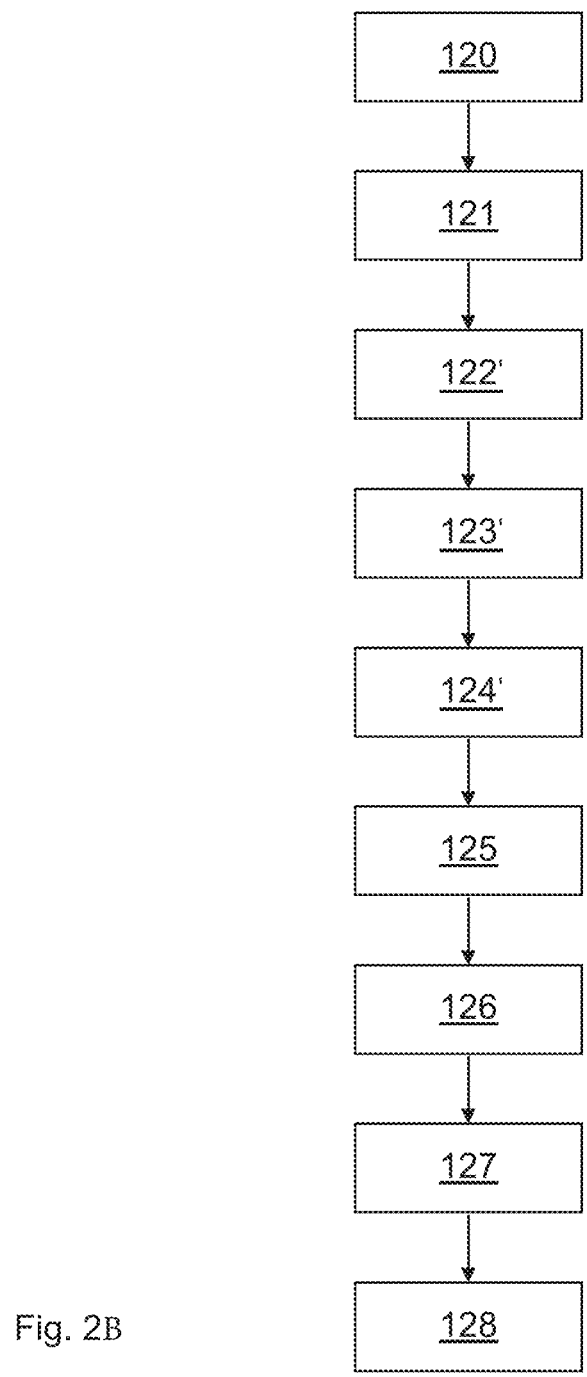
FIG. 2B shows an alternative sequence of a method for manufacturing motor vehicle headlight lenses or lens-like freeforms for a motor vehicle headlight or optical elements, from glass.

FIG. 1, as well as FIG. 1A and FIG. 1B, are schematic views of a device 1, 1A and 1B, respectively, for carrying out a method set out in FIG. 2A or FIG. 2B for manufacturing optical elements, for example optical lenses, such as motor vehicle headlight lenses, e.g. such as the (motor vehicle) headlight lens 202 or (lens-like) freeform, shown schematically in FIG. 30, for example a motor vehicle headlight, the use of which will be described in the following, for example, with reference to FIG. 41.

Figure 30:
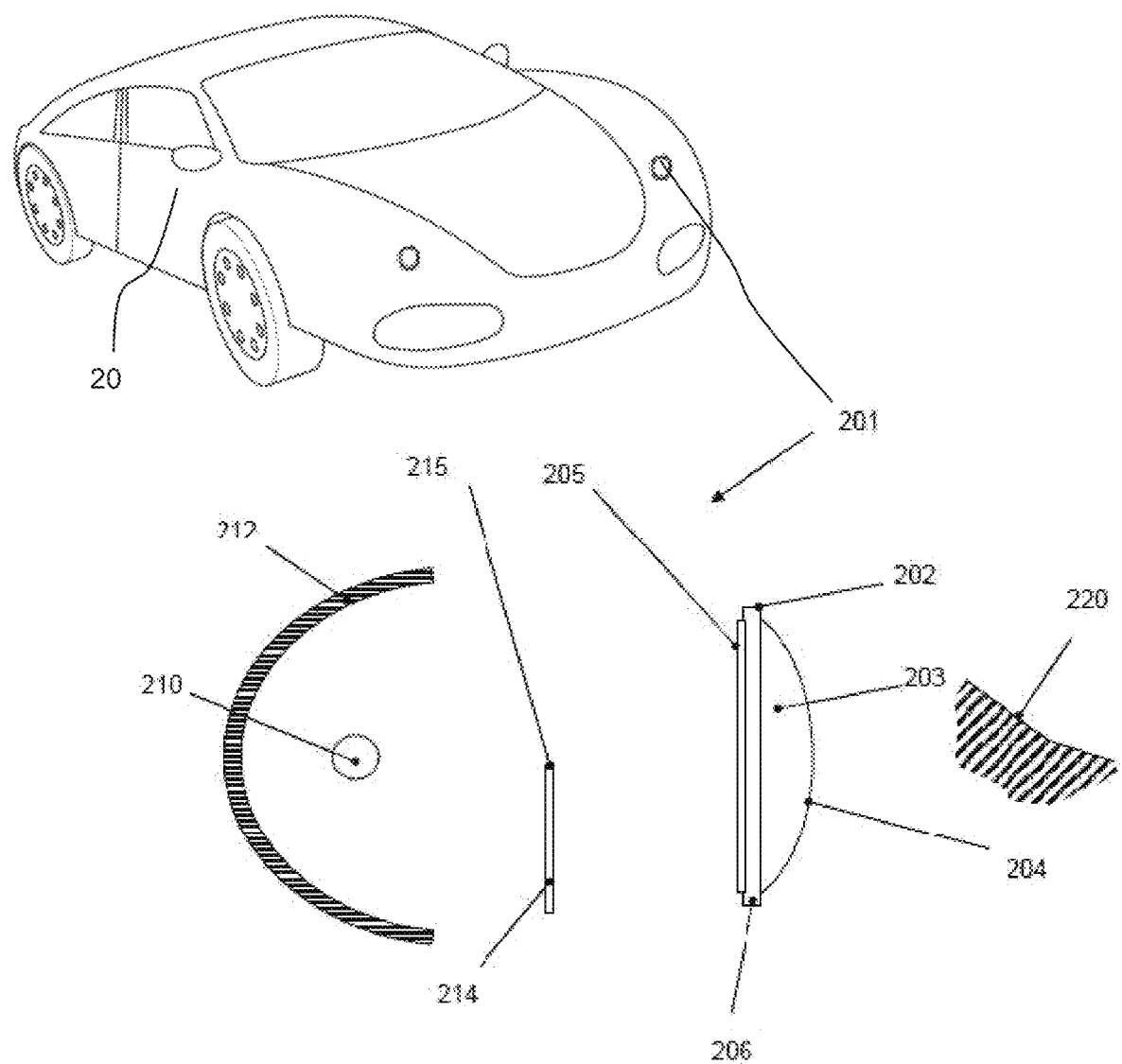
FIG. 30 is a schematic view of a motor vehicle headlight (projection headlight) comprising a headlight lens.

FIG. 30 is a schematic view of a motor vehicle headlight 201 (projection headlight) of a motor vehicle 20, comprising a light source 210 for generating light, a reflector 212 for reflecting light that can be generated by means of the light source 210, and a shield 214. The motor vehicle 201 furthermore comprises a headlight lens 202 for depicting an edge 215 of a shield 214, as a cut-off line 220, on the carriageway, by means of light that can be generated by the light source 210. Typical requirements for the cut-off line or for the light distribution taking account of or incorporating the cut-off line is disclosed for example in Bosch—Automotive Handbook, $9^{th}$ edition, ISBN 978-1-119-03294-6, page 1040. Within the meaning of this disclosure, a headlight lens is for example a headlight lens by means of which a cut-off line can be generated, and/or a headlight lens by means of which the requirements according to Bosch—Automotive Handbook, $9^{th}$ edition, ISBN 978-1-119-03294-6 (incorporated by reference in its entirety), page 1040 can be fulfilled. The headlight lens 202 comprises a glass lens body 203 that comprises a substantially planar (for example optically active) surface 205 facing the light source 210, and a substantially convex (for example optically active) surface 204 facing away from the light source 210. The headlight lens 202 additionally comprises a (for example peripheral) edge 206, by means of which it may be possible to fasten the headlight lens 202 in the motor vehicle headlight 201. The elements in FIG. 30 are drawn taking account of simplicity and clarity, and are to necessarily true to scale. Thus, for example, the orders of magnitude of some elements are shown exaggerated relative to other elements, in order to improve understanding of the embodiment of the present disclosure.

Figure 31:
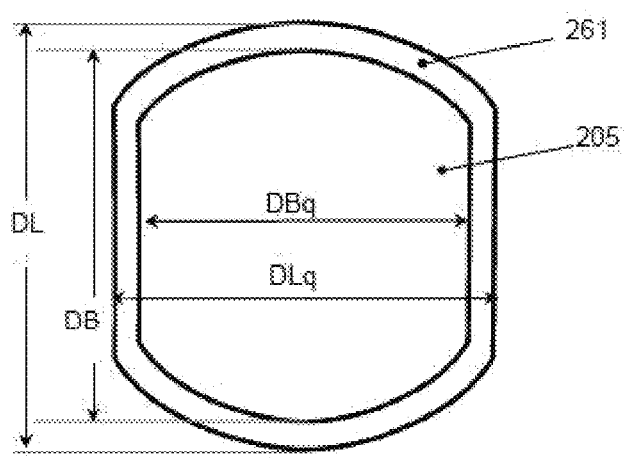
FIG. 31 is a view from below of the headlight lens according to FIG. 30.
Figure 32:
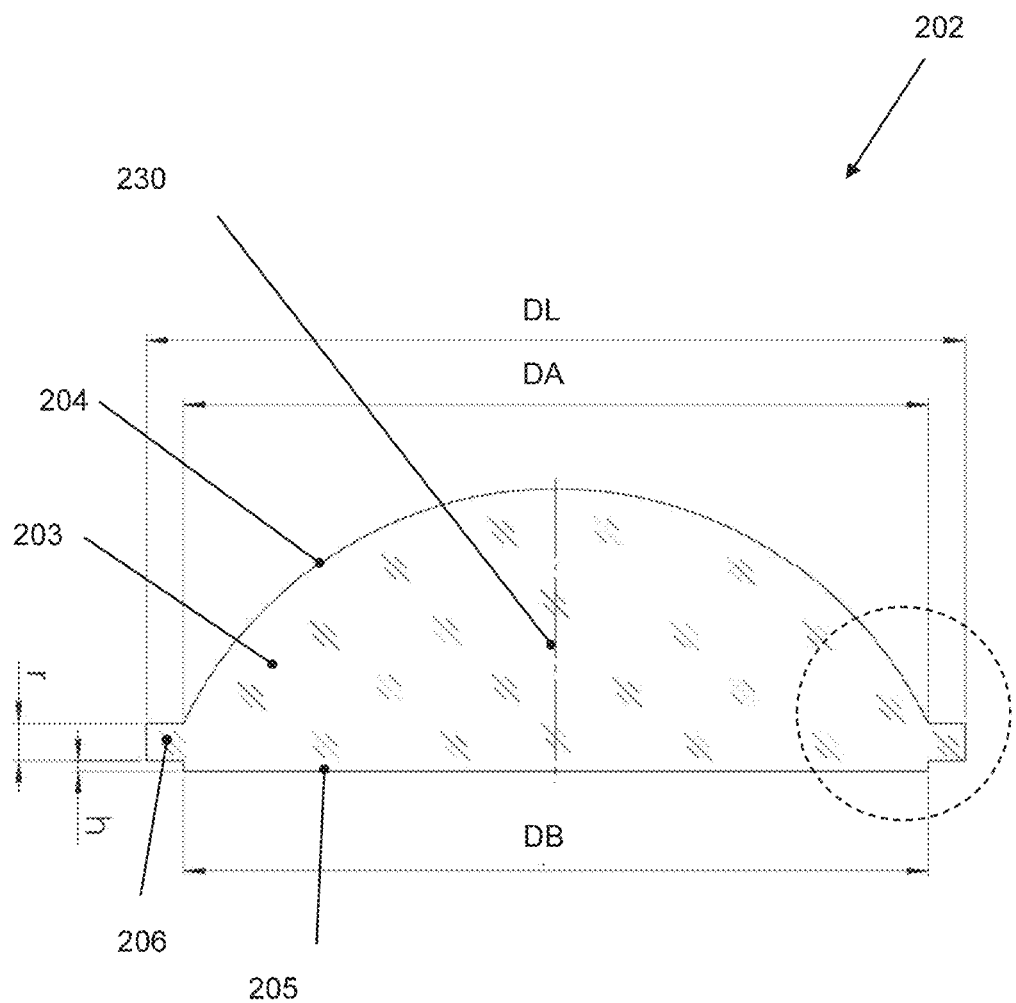
FIG. 32 is a cross-sectional view of the lens according to FIG. 31.
Figure 33:
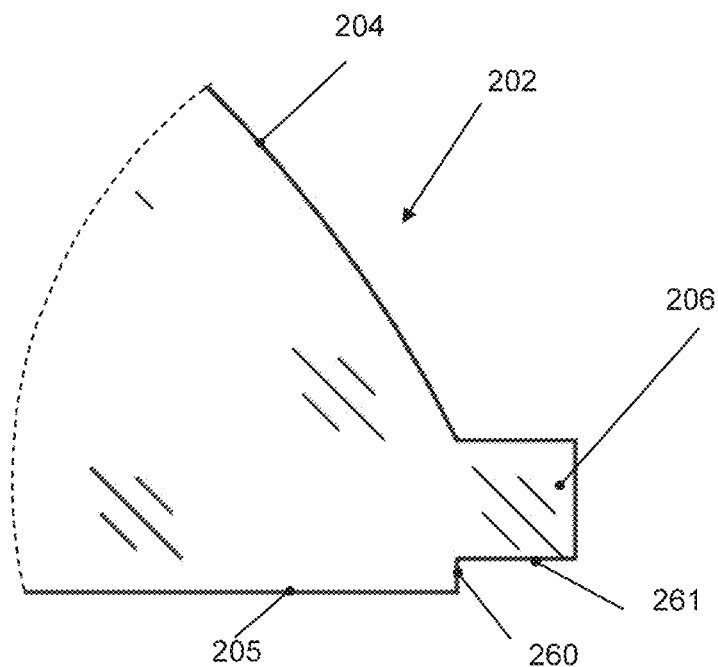
FIG. 33 shows a detail from the view according to FIG. 32.

FIG. 31 shows the headlight lens 202 from below. FIG. 32 is a cross section through an embodiment of the headlight lens. FIG. 33 is a detail of the headlight lens 202 marked by a dot-dash circle in FIG. 32. The planar (for example optically active) surface 205 protrudes beyond the lens edge 206 or beyond the surface 261 of the lens edge 206 facing the light source 210, in the form of a step 260, towards the optical axis 230 of the headlight lens 202, wherein the height of the step 260 is for example no more than 1 mm, for example no more than 0.5 mm. The nominal value of the height h of the step 260 is for example 0.2 mm.

The thickness r of the lens edge 206 is at least 2 mm, but no more than 5 mm. The diameter DL of the headlight lens 202 is at least 40 mm but no more than 100 mm. The diameter DB of the substantially planar (for example optically active) surface 205 is equal to the diameter DA of the convexly curved optically active surface 204. In one embodiment, the diameter DB of the substantially planar optically active surface 205 is no more than 110% of the diameter DA of the convexly curved optically active surface 204. Furthermore, the diameter DB of the substantially planar optically active surface 205 is for example at least 90% of the diameter DA of the convexly curved optically active surface 204. The diameter DL of the headlight lens 202 is for example approximately 5 mm greater than the diameter DB of the substantially planar optically active surface 205 or than the diameter DA of the convexly curved optically active surface 204. The diameter Dlq of the headlight lens 202 is at least 40 mm but no more than 80 mm, and is smaller than the diameter DL. The diameter Dlq of the headlight lens 202 is for example approximately 5 mm greater than the diameter Dbq.

In a further embodiment of the present disclosure, the (optically active) surface 204 intended to be facing away from the light source, and/or the (optically active) surface 205 intended to be facing the light source, comprises a light-scattering surface structure (formed/molded by means of casting). A suitable light-scattering surface structure comprises for example a modulation and/or a (surface) roughness of at least 0.05 μm, for example at least 0.08 μ, or is formed as a modulation optionally having an additional (surface) roughness of at least 0.05 μm, for example at least 0.08 μ. Within the meaning of this disclosure, roughness is intended to be defined for example as Ra, for example pursuant to ISO 4287. In a further embodiment of the present disclosure, the light-scattering surface structure can comprise a structure replicating a golf ball surface of can be designed as a structure replicating a golf ball surface. Suitable light-scattering surface structures are disclosed e.g. in DE 10 2005 009 556, DE 102 26 471 B4 and DE 299 14 114 U1. Further embodiments of light-scattering surface structures are disclosed in the German patent specification 1 099 964, DE 36 02 262 C2, DE 40 31 352 A1, U.S. Pat. No. 6,130,777, US 2001/0033726 A1, JP 2010123307 A, and JP 2001147403.

Figure 35:
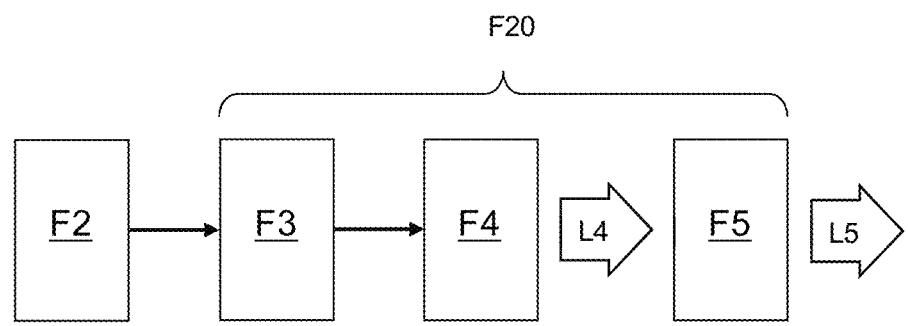
FIG. 35 is a schematic view of an embodiment of a vehicle headlight according to FIG. 1.
Figure 36:
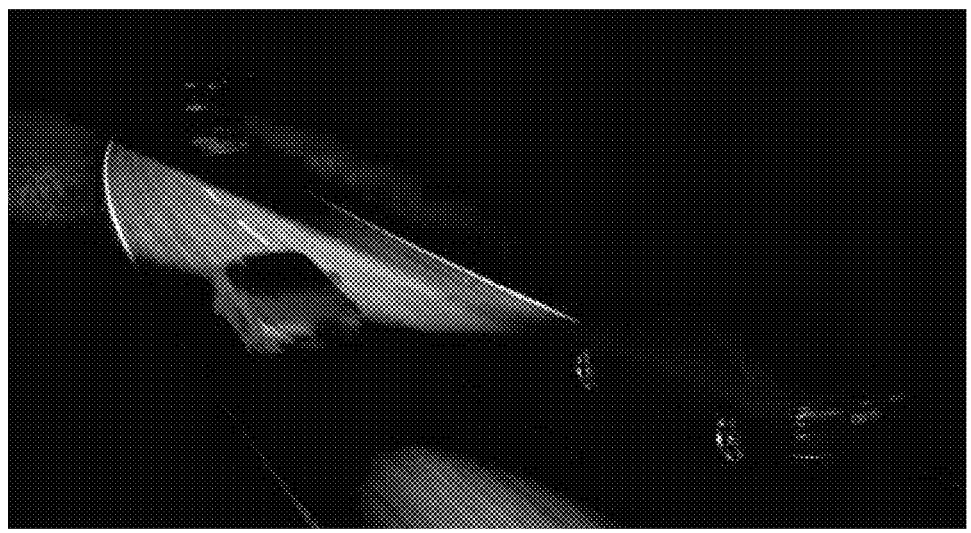
FIG. 36 shows an embodiment for a matrix light or adaptive full beam.
Figure 37:
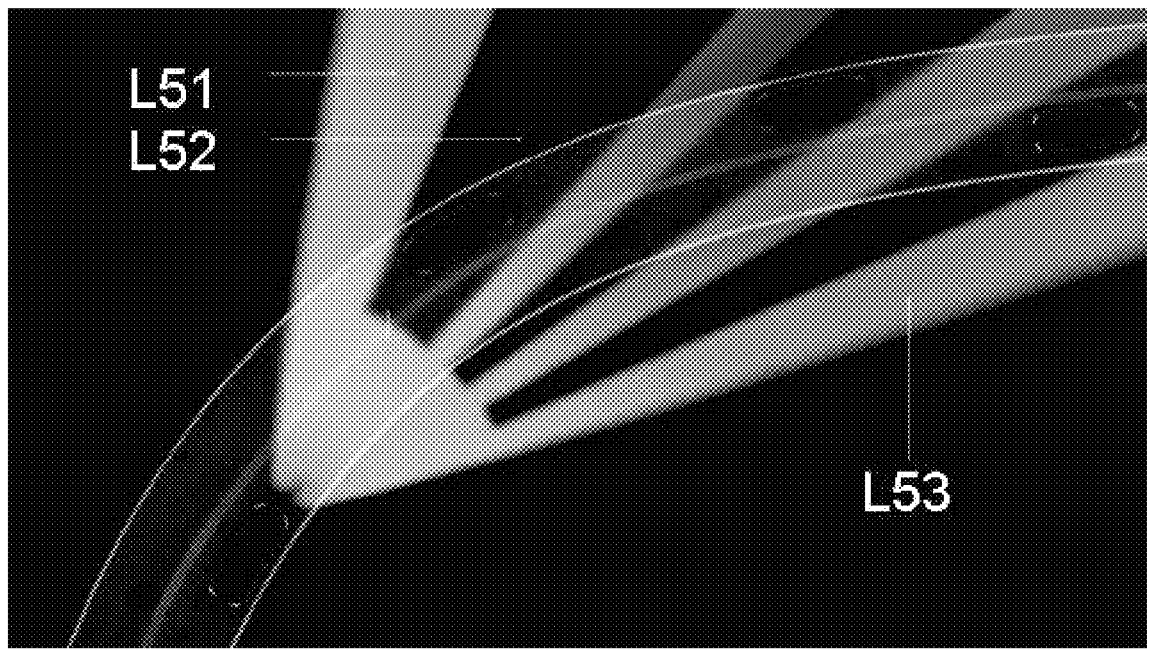
FIG. 37 shows a further embodiment for a matrix light or adaptive full beam.

FIG. 35 shows an adaptive headlight or vehicle headlight F20 for situation or traffic-dependent illumination of the surroundings or the carriageway in front of the motor vehicle 20, depending on sensor means F2 of the motor vehicle 20 for sensing the surroundings. For this purpose the vehicle headlight F20 shown schematically in FIG. 35 comprises an illumination device F4 which is actuated by means of a controller F3 of the vehicle headlight F20. Light L4 generated by the illumination device F4 is emitted from the vehicle headlight F20, as an illumination pattern L5, by means of an objective F5 that may comprise one or more optical lens elements of headlight lenses. Examples for corresponding illumination patterns are shown in FIG. 36 and FIG. 37, and can be found on the webpages web.archive.org/web/20150109234745/http://www.audi.de/content/de/brand/de/vorsprung_durch_technik/content/2013/08/Audi-A8-erstrahlt-in-neuem-Licht.html (retrieved on May 9, 2019) and www.all-electronics.de/matrix-led-und-laser-licht-bietet-viele-vorteile/(retrieved on Feb. 9, 2019). In the embodiment according to FIG. 37 the illumination pattern L5 comprises full beam regions L51, dimmed regions L52 and bending light L53.

Figure 38:
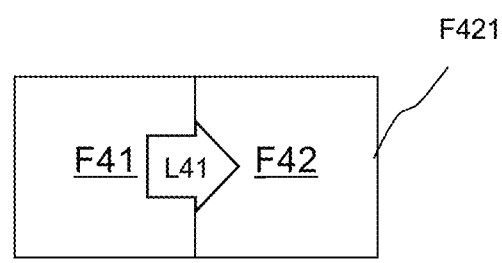
FIG. 38 shows an embodiment of an illumination device of a vehicle headlight according to FIG. 35.

FIG. 38 shows an embodiment for the illumination device F4, wherein said device comprises a light source arrangement F410 having a plurality of individually adjustable regions or pixels. It is thus possible, for example, for up to 100 pixels, up to 1000 pixels, or no fewer than 1000 pixels to be provided, which pixels can be individually actuated by the controller F3 in the sense that they can for example be activated or deactivated individually. It may be possible for the illumination device F4 to furthermore comprise attachment optics F411 for generating an illumination pattern (such as L4) on the light exit surface F412, depending on the correspondingly actuated regions or pixels of the light source arrangement F410 or in accordance with the light L41 shone into the attachment optics F411.

Figure 39:
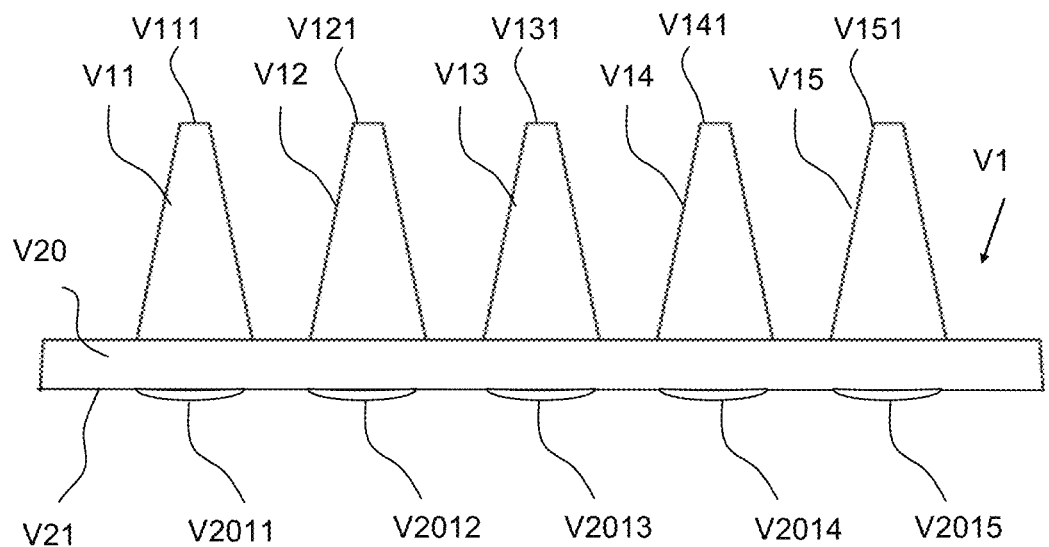
FIG. 39 is a side view of an embodiment for an attachment optics array.
Figure 40:
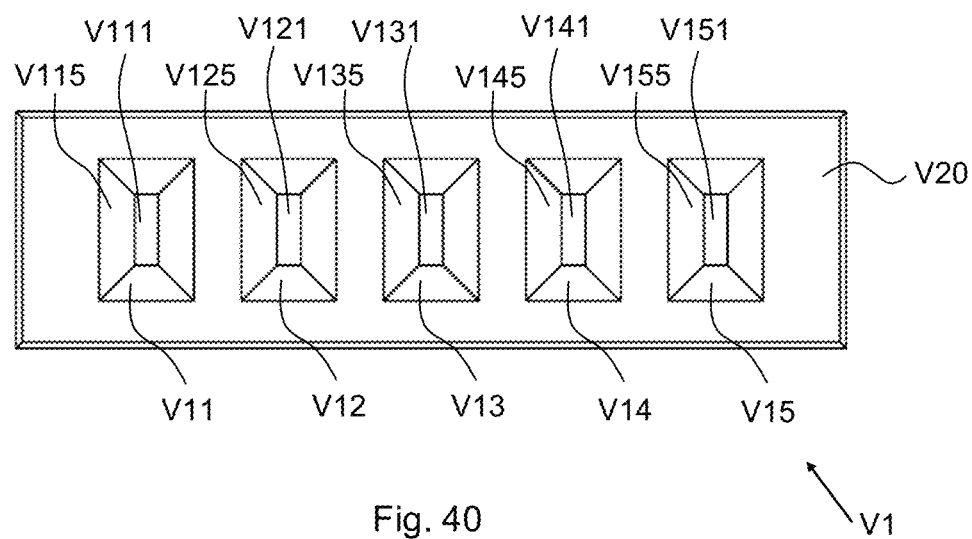
FIG. 40 is a plan view of the attachment optics array according to FIG. 39.

FIG. 39 is a side view of an integral attachment optics array V1. FIG. 40 is a plan view of the attachment optics array 1. The attachment optics array V1 comprises a base part V20, on which are formed lenses V2011, V2012, V2013, V2014 and V2015 and attachment optics V11 comprising a light entry surface V111, attachment optics V12 comprising a light entry surface V121, attachment optics V13 comprising a light entry surface V131, attachment optics V14 comprising a light entry surface V141, and attachment optics V15 comprising a light entry surface V151. The lateral surfaces V115, V125, V135, V145, V155 of the attachment optics V11, V12, V13, V14, V15 are press molded and designed such that light entering into the relevant light entry surface V111, V121, V131, V141 or V151 by means of a light source undergoes total internal reflection (TIR), such that said light emerges from the base part V20 or from the surface V21 of the base part V20, which forms the common light exit surface of the attachment optics V11, V12, V13, V14 and V15. The rounding radii between the light entry surfaces V111, V121, V131, V141 and V151, at the transition to the lateral surfaces V115, V125, V135, V145 and V155, are for example 0.16 to 0.2 mm.

Figure 41:
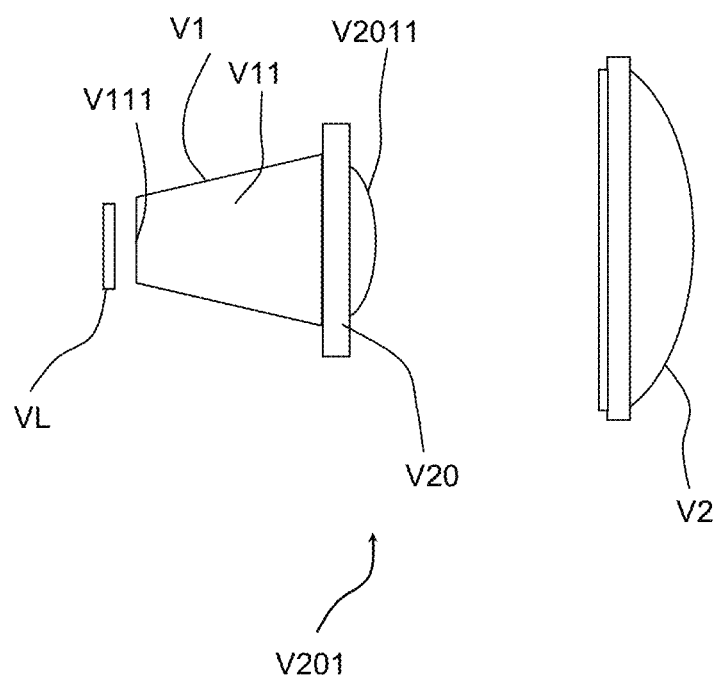
FIG. 41 shows the use of an attachment optics array according to FIG. 39 and FIG. 40 in a motor vehicle headlight.

FIG. 41 is a schematic view of a vehicle headlight V201 or a motor vehicle headlight. The vehicle headlight V201 comprises a light source arrangement VL, for example comprising LEDs, for shining light into the light entry surface V111 of the attachment optics V11 or the light entry surfaces V112, V113, V114 and V115 (not shown in greater detail) of the attachment optics V12, V13, V14 and V15.

Furthermore, the vehicle headlight comprises a secondary lens V2 for depicting the light exit surface V21 of the attachment optics array V1.

The device 1 for manufacturing optical elements, such as the headlight lens 202, comprises a melting unit 2, such as a trough, in which soda lime glass, in the present embodiment DOCTAN®, is melted in a process step 120.

The melting unit 2 may for example comprise a controllable outlet 2B. In a process step 121, liquid glass is transferred from the melting unit 2 into a preforming device 3 for manufacturing a preform, for example having a mass of from 50 g to 250 g, such as a gob or a preform close to the final contour (a preform close to the final contour has a contour that is similar to the motor vehicle headlight lens or lens-like freeform for the motor vehicle headlight that is to be molded). These can for example comprise molds into which a defined amount of glass is poured. In a process step 122, the preform is manufactured by means of the preforming device 3.

The process step 122 is followed by a process step 123, in which the preform is transferred, by means of a transfer station 4, to one of the cooling devices 5A, 5B or 5C, and is cooled, by means of which the cooling device 5A, 5B or 5C, at a temperature of between 300° C. and 500° C., for example between 350° C. and 450° C. In the present embodiment, the preform is cooled at a temperature of 400° C. for more than 10 minutes, such that the inside temperature thereof is approximately 500° C.

In a subsequent process step 124, the preform is heated, by means of one of the heating devices 6A, 6B or 6C, at a temperature of between 1000° C. and 1250° C., wherein it is for example possible for the preform to be heated such that the temperature of the surface of the preform following heating is at least 100° C., for example at least 150° C., higher than $T_G$, and is for example 750° C. to 850° C. A combination of the cooling device 5A with the heating device 6A, a combination of the cooling device 5B with the heating device 6B, or a combination of the cooling device 5C with the heating device 6C is an example of a temperature-controlling device for setting the temperature gradient.

Figure 14:
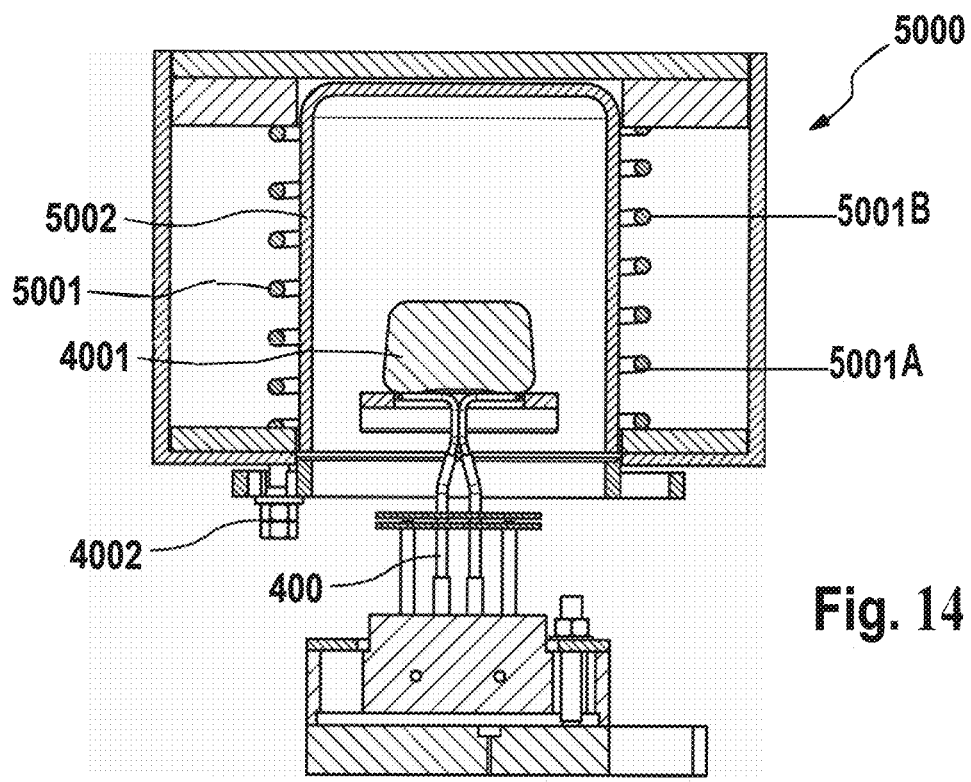
FIG. 14 shows a lance according to FIG. 3 in a top-hat furnace comprising a protective cap for heating a gob.
Figure 15:
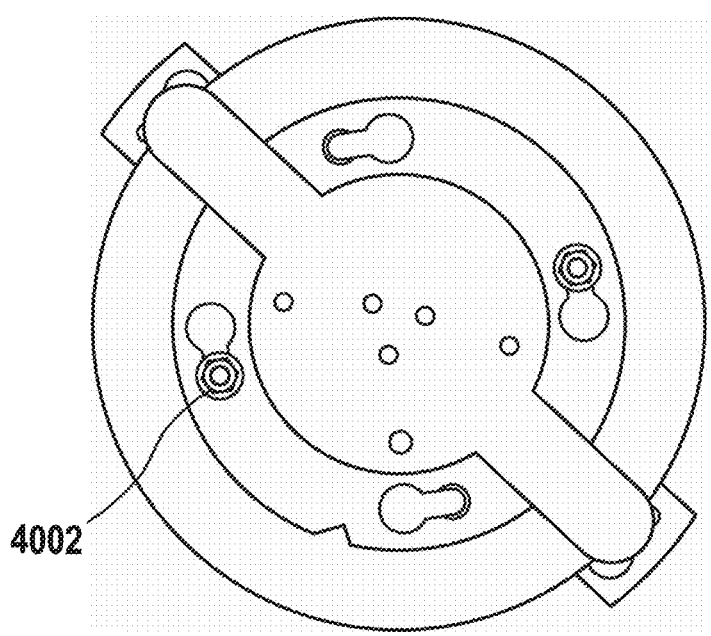
FIG. 15 is a view from below of the top-hat furnace according to FIG. 14.

In another embodiment, said temperature-controlling device or the combination of the heating devices 5A and 6A, 5B and 6B, 5C and 6C, is designed as a top-hat furnace 5000, as shown in FIG. 14. In this case, FIG. 14 shows a gob 4001 to be heated, on a lance 400. In order to warm or heat the gob 4001, heating coils 5001 are provided. In order to protect said heating coils 5001 from bursting of a defective gob, the interior of the top-hat furnace 5000 is lined with a protective cap 5002. FIG. 15 is a view from below of the top-hat furnace 5000 according to FIG. 14, FIG. 16 is a cross section through the protective cap 5002 according to FIG. 14, FIG. 17 is a view of the inside of the protective cap 5002 according to FIG. 14. In the embodiment according to FIG. 14, the protective cap 5002 is cup-shaped. In this case, the protective cap 5002 comprises a cylindrical region 5112 that transitions, via a rounded region 5132, into a covering region 5122. The radius of curvature of the curved region 5132 is for example between 5 mm and 20 mm. In the embodiment according to FIG. 16, the radius of curvature of the curved region 5132 is approximately 10 mm. The protective cap 5002 is secured in the top-hat furnace 5000 and fixed by a nut 4002. In another preferred embodiment, a bayonet closure is provided, by means of which a protective cap can be exchanged even more quickly.

Figure 19:
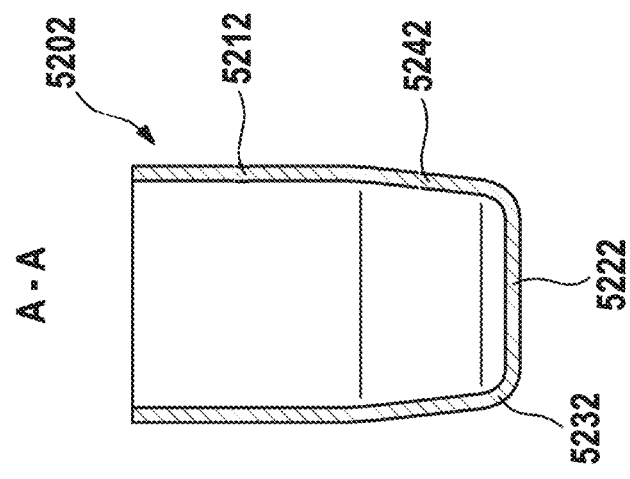
FIG. 19 is a cross section through a further protective cap.
Figure 20:
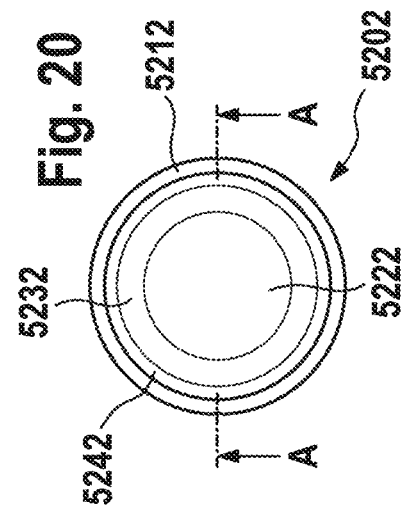
FIG. 20 is a view of the inside of the protective cap according to FIG. 19.

FIG. 19 is a cross section through an embodiment of a further protective cap 5202. FIG. 20 is a view of the inside of the protective cap 5202 according to FIG. 19. The protective cap 5202 is likewise cup-shaped, but, as well as a cylindrical region 5212, also comprises a conical region 5242. The conical region 5242 transitions, via a curvature 5232, into a region 5222 to be covered. The conical region 5242 defines a volume that is between 30% and 50% of the volume of the cavity of the protective cap 5202.

Figure 23:
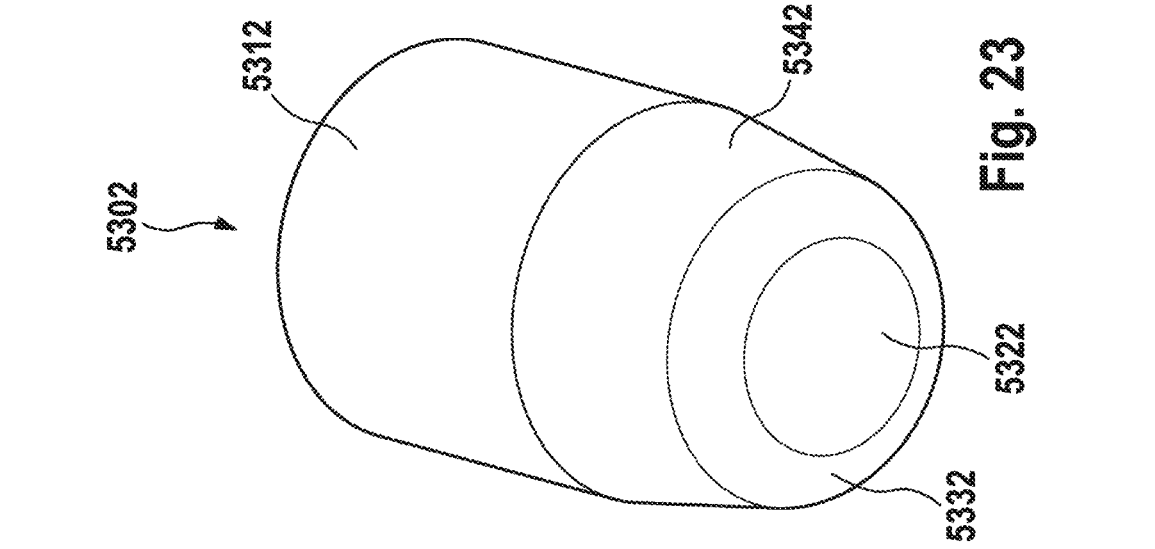
FIG. 23 is a perspective view of the protective cap according to FIG. 21.
Figure 21:
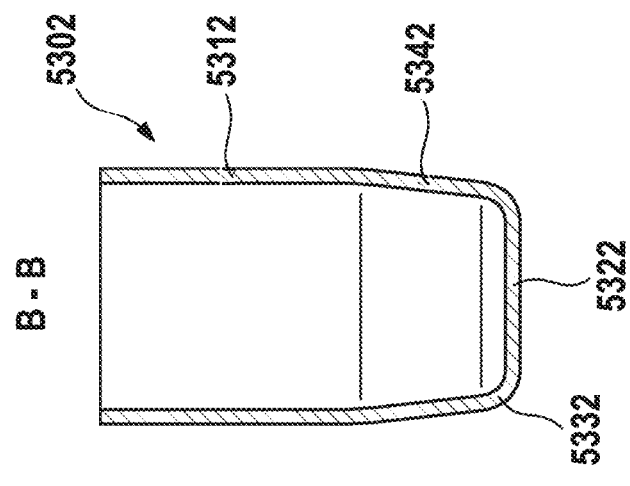
FIG. 21 is a cross section through a further protective cap.
Figure 22:
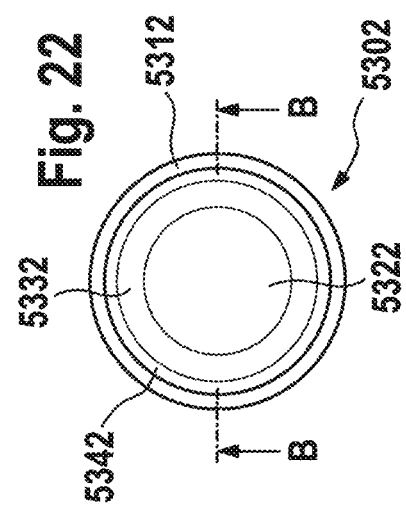
FIG. 22 is a view of the inside of the protective cap according to FIG. 21.

FIG. 21 is a cross section through an embodiment of a further protective cap 5302, FIG. 22 is a view of the inside of the protective cap 5302 according to FIG. 21, FIG. 23 is a perspective view of the protective cap 5302. The protective cap 5302 is likewise cup-shaped, but, as well as a cylindrical region 5312, also comprises a conical region 5342. The conical region 5342 transitions, via a curvature 5232, into a region 5222 to be covered. The conical region 5342 defines a volume that is between 30% and 50% of the volume of the cavity of the protective cap 5302.

The protective caps 5002, 5202, 5302 are intended, for example, for protecting the heating coils 5001, located in the furnace, from shattering glass. If a gob bursts in the furnace without said protective cap, some or the majority of the glass remains caught on the heating coils 5001 and thus significantly impedes the heating process of the following gob, or even destroys the heating coils 5001, and thus the entire function of the furnace. The protective caps 5002, 5202, 5302 are removed following bursting of a gob, and are replaced by different protective caps. The protective cap 5002, 5202, 5302 are adjusted to the size of the furnace.

The heating coil 5001 may consist of or comprise a plurality of independently driveable heating coils 5001A and 5001B. This independent driving provides for a particularly suitable, for example homogenous, temperature (distribution) to be achieved inside the furnace or inside the protective caps 5002, 5202, 5303. In addition to the function thereof for reducing the extent of gob bursting, the protective caps 5002, 5202, 5303 also contribute to said desired temperature distribution. The protective caps for example consist of or comprise silicon carbide.

Figure 5:
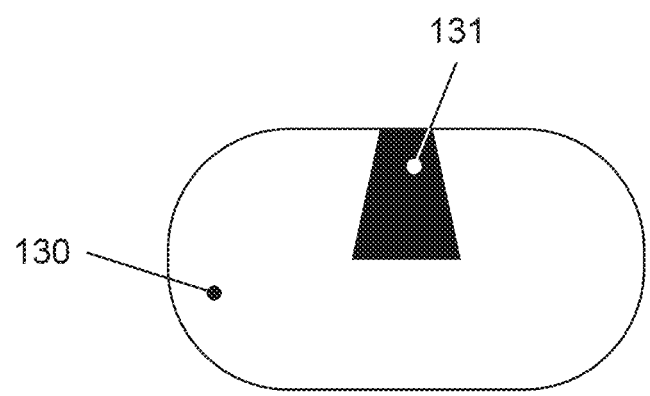
FIG. 5 shows a preform, by way of example, prior to entering a temperature-controlling device.
Figure 6:
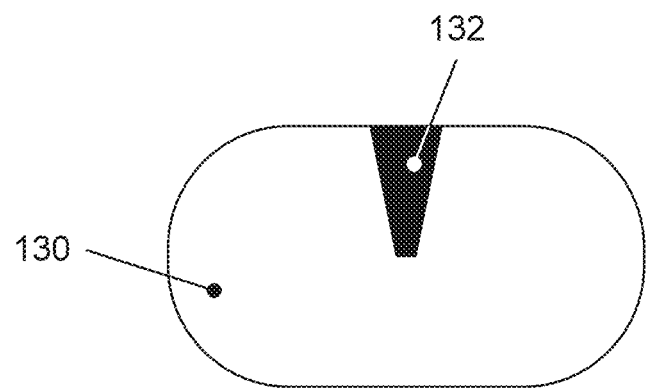
FIG. 6 shows a preform, by way of example, having an inverted temperature gradient, after leaving a temperature-controlling device.

As described in the following with reference to FIG. 5 and FIG. 6, the process steps 123 and 124 are adjusted to one another, such that an inversion of the temperature gradient is achieved. In this case, FIG. 5 shows a preform 130, by way of example, prior to entering the cooling devices 5A, 5B or 5C, and FIG. 15 shows the preform 130 having an inverted temperature gradient, after leaving one of the heating devices 6A, 6B or 6C. Whereas, prior to process step 123 (in the case of a continuous temperature profile), the blank is warmer on the inside than on the outside, following process step 124 (in the case of a continuous temperature) it is warmer on the outside than on the inside. In this case, the wedges denoted by reference signs 131 and 132 symbolize the temperature gradients, wherein the width of a wedge 131 or 132 symbolizes a temperature.

Figure 3:
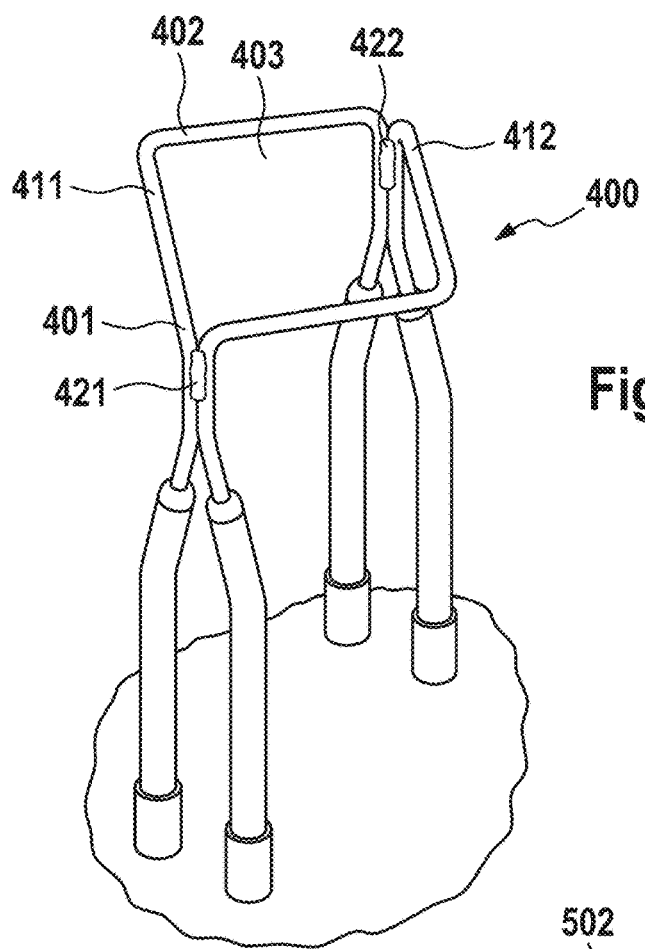
FIG. 3 shows an embodiment of a lance.
Figure 4:
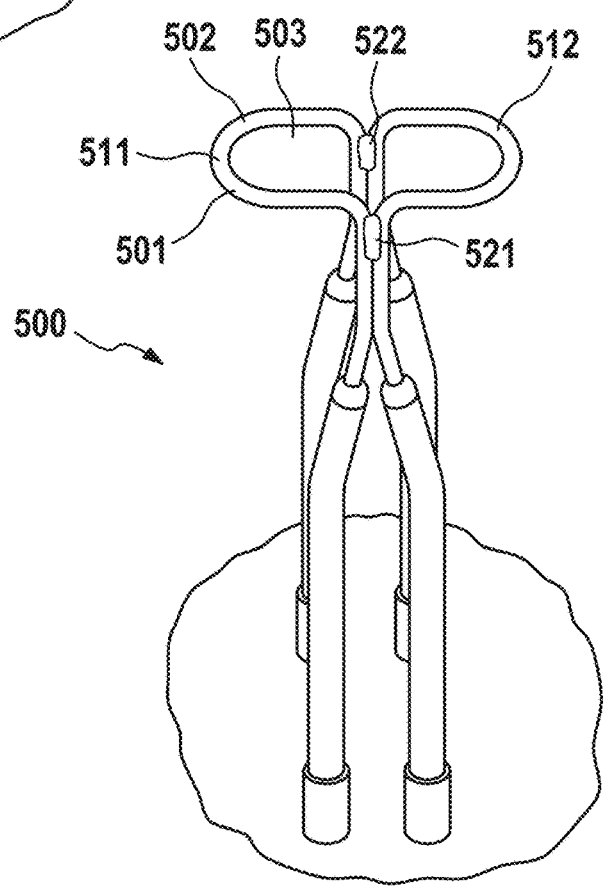
FIG. 4 shows a further embodiment of a lance.

For the purpose of inverting the temperature gradient thereof, in one embodiment a preform is moved (for example substantially continuously), resting on a cooled lance (not shown), through a temperature-controlling device comprising the cooling devices 5A, 5B or 5C, and a temperature-controlling device comprising the heating devices 6A, 6B or 6C, and/or is retained in one of the cooling devices 5A, 5B or 5C and/or one of the heating devices 6A, 6B or 6C. A cooled lance is disclosed in DE 101 00 515 A1 and in DE 101 16 139 A1. Depending on the shape of the preform, for example FIG. 3 and FIG. 4 show suitable lances. Coolant flows through the lance in the counter-current principle for example. Alternatively or in addition it may be possible for the coolant to be additionally or actively heated.

In the following, the term "support device" is also used for the term "lance". The support device 400 shown in FIG. 3 comprises a supporting body 401 having a hollow cross section and an annular contact face 402. The supporting body 401 is tubular, at least in the region of the contact face 402, and is uncoated at least in the region of the contact face 402. The diameter of the hollow cross section of the supporting body 401, at least in the region of the contact face 402, is no less than 0.5 mm and/or no greater than 1 mm. The outside diameter of the supporting body 401, at least in the region of the contact face, is no less than 2 mm and/or no greater than 3 mm. The contact face 402 spans a square base surface 403 having rounded corners. The supporting body 401 comprises two flow channels 411 and 412 for the cooling medium flowing through, which channels in each case extend over only a portion of the annular contact face 402, wherein the flow channels 411 and 412 are connected by means of a metal filling material 421 and 422, for example a solder agent, in a region in which they leave the contact face 402.

The support device 500 shown in FIG. 4 comprises a supporting body 501 having a hollow cross section and an annular contact face 502. The supporting body 501 is tubular, at least in the region of the contact face 502, and is uncoated at least in the region of the contact face 502. The diameter of the hollow cross section of the supporting body 501, at least in the region of the contact face 502, is no less than 0.5 mm and/or no greater than 1 mm. The outside diameter of the supporting body 501, at least in the region of the contact face, is no less than 2 mm and/or no greater than 3 mm. The contact face 502 spans an oval base surface 503. The supporting body 501 comprises two flow channels 511 and 512 for the cooling medium flowing through, which channels in each case extend over only a portion of the annular contact face 502, wherein the flow channels 511 and 512 are connected by means of a metal filling material 521 and 522, for example a solder agent, in a region in which they leave the contact face 502.

It may be possible for preforms to be removed after passing through the cooling device 5A, 5B or 5C, and for example to be supplied to an intermediate store (e.g. in which they are stored at room temperature), by means of a transport device 41. It may furthermore be possible for the preform to be fed to the transfer station 4 by means of a transport device 42, and in the further process (for example proceeding from room temperature) are phased in by means of being heated in the heating devices 6A, 6B or 6C.

In a manner deviating from the method described with reference to FIG. 2A, in the method described with reference to FIG. 2B process step 121 is followed by process step 122', in which a cast gob is transferred, by means of a transfer station 4, to a cooling path 49 of the device 1A, shown in FIG. 1A. Within this meaning, a cooling path is for example a conveying means, such as a conveyor belt, through which a gob is guided and is in the process cooled, while adding heat. The cooling takes place until a specified temperature above room temperature, or until room temperature, wherein the gob is cooled down to room temperature in the cooling path 49 or outside the cooling path 49. It is possible, for example, for a gob in the cooling path 49 to rest on a support made of graphite or a support comprising graphite.

In the following process step 123' according to FIG. 2B, the gobs are supplied to a device 1B. The devices 1A and 1B may be located spatially close together, or also further apart. In the latter case, a transfer station 4A transfers the gobs from the cooling path 49 into a transport container BOX. The gobs are transported, in the transport container BOX, to the device 1B, in which a transfer station 4B removes the gobs from the transport container BOX and transfers them to a top-hat furnace 5000. The gobs are hated in the top-hat furnace 5000 (process step 124').

Figure 24:
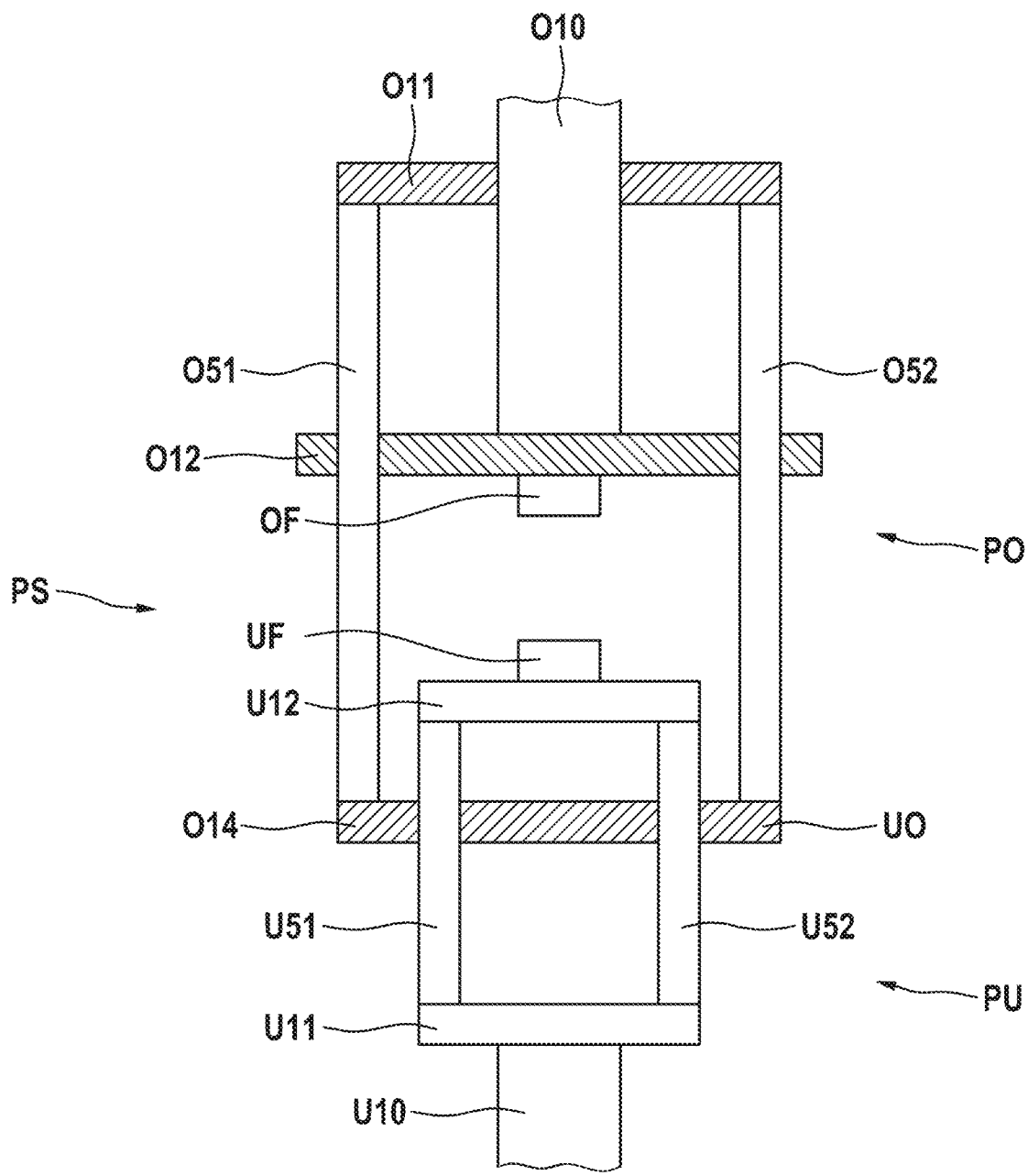
FIG. 24 is a schematic view of a molding station for molding a headlight lens out of a heated blank.

A mold or molding station 8 is provided behind the heating devices 6A, 6B, 6C or 5000, to which mold or molding station a preform is transferred by means of a transfer station 7. By means of the mold or molding station 8, in a process step 125 the preform is press molded, for example on both sides, to form the headlight lens 202. A suitable mold set is disclosed for example in EP 2 104 651 B1. FIG. 24 is a schematic view of a molding station PS for molding a headlight lens out of a heated blank. The molding station PS is part of the mold according to FIG. 1. The molding station PS comprises an upper molding unit PO and a lower molding unit PU. For the purpose of molding, a mold OF (upper mold), which is moved by means of a mold drive or by means of an actuator O10, and a mold UF (lower mold), which is moved by means of a mold drive or by means of an actuator U10. The mold UF is connected to a displaceable connecting piece U12 on the mold side, which is in turn connected, by means of displaceable guide rods U51, U52, to a displaceable connecting piece U11 on the actuator side. The actuator U10 is in turn connected to the displaceable connecting piece U11 on the actuator side, such that the mold UF is displaceable by means of the actuator U10. The displaceable guide rods U51 and U52 extend through recesses of a fixed guide element UO, such that a deflection or movement of the displaceable guide rods U51 and U52, and thus of the mold UF, perpendicularly to the displacement direction, is prevented or reduced or limited.

The molding unit PO comprises an actuator O10 which displaces the mold OF and is connected to a displaceable guide element O12. The molding unit PO furthermore comprises a frame which is formed of a fixed connecting piece O11 on the actuator side and a fixed connecting piece O14 on the mold side, as well as fixed guide rods O51 and O52 which connect the fixed connecting piece O11 on the actuator side to the fixed connecting piece O14 on the mold side. The fixed guide rods O51 and O52 are guided through recesses of the displaceable guide element O12, such that they obstruct, reduce or prevent a movement or deflection of the mold OF orthogonally to the displacement direction of the actuator O10 or of the mold OF.

In the embodiment shown, the molding units PO and PU are linked in that the fixed guide element UO is the same as the fixed connecting piece O14 on the mold side. As a result of this linking or concatenation of the two molding units PO and PU of the molding station PS, particularly high quality of the headlight lenses to be molded is achieved.

Figure 25:
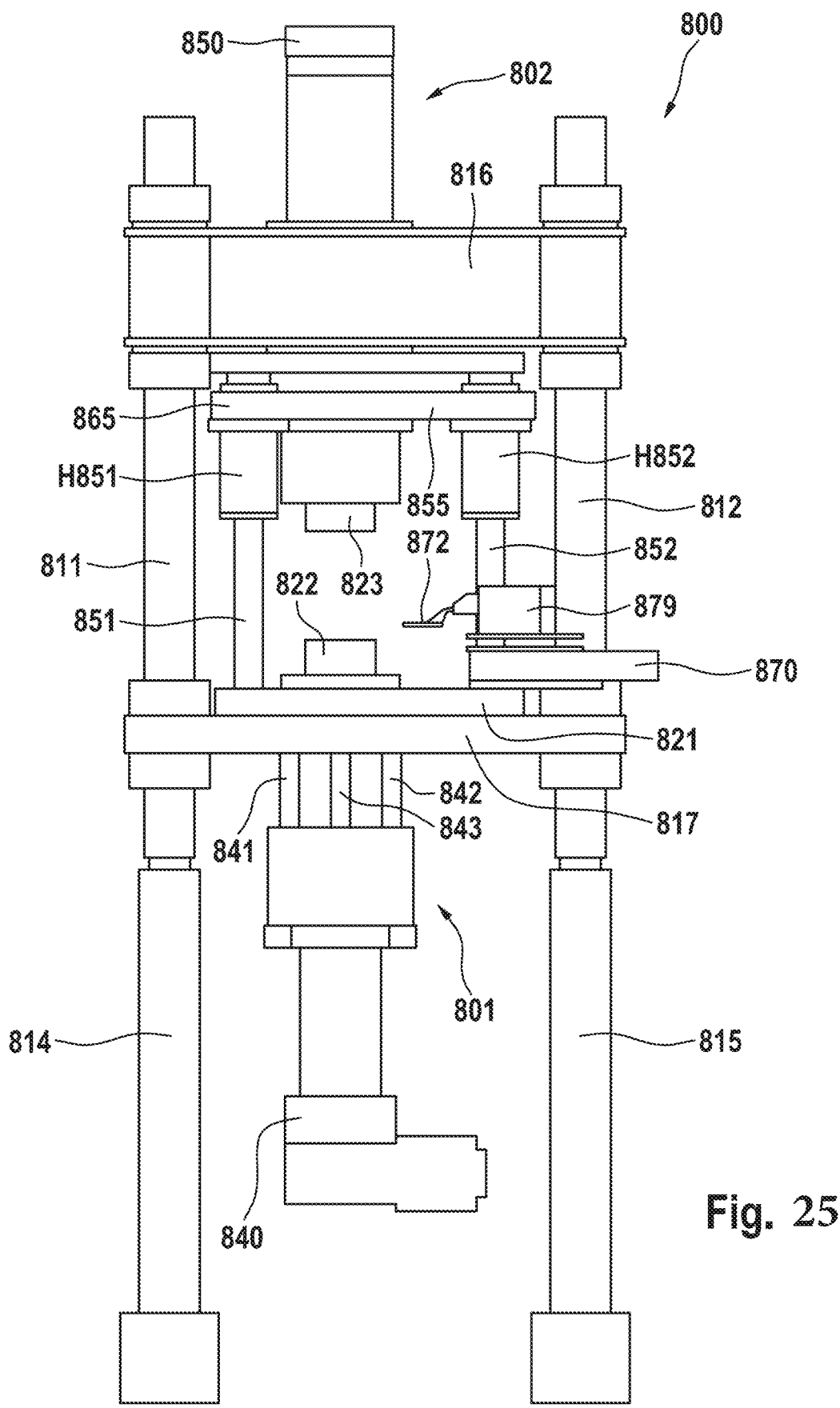
FIG. 25 shows a further embodiment of a molding station.
Figure 26:
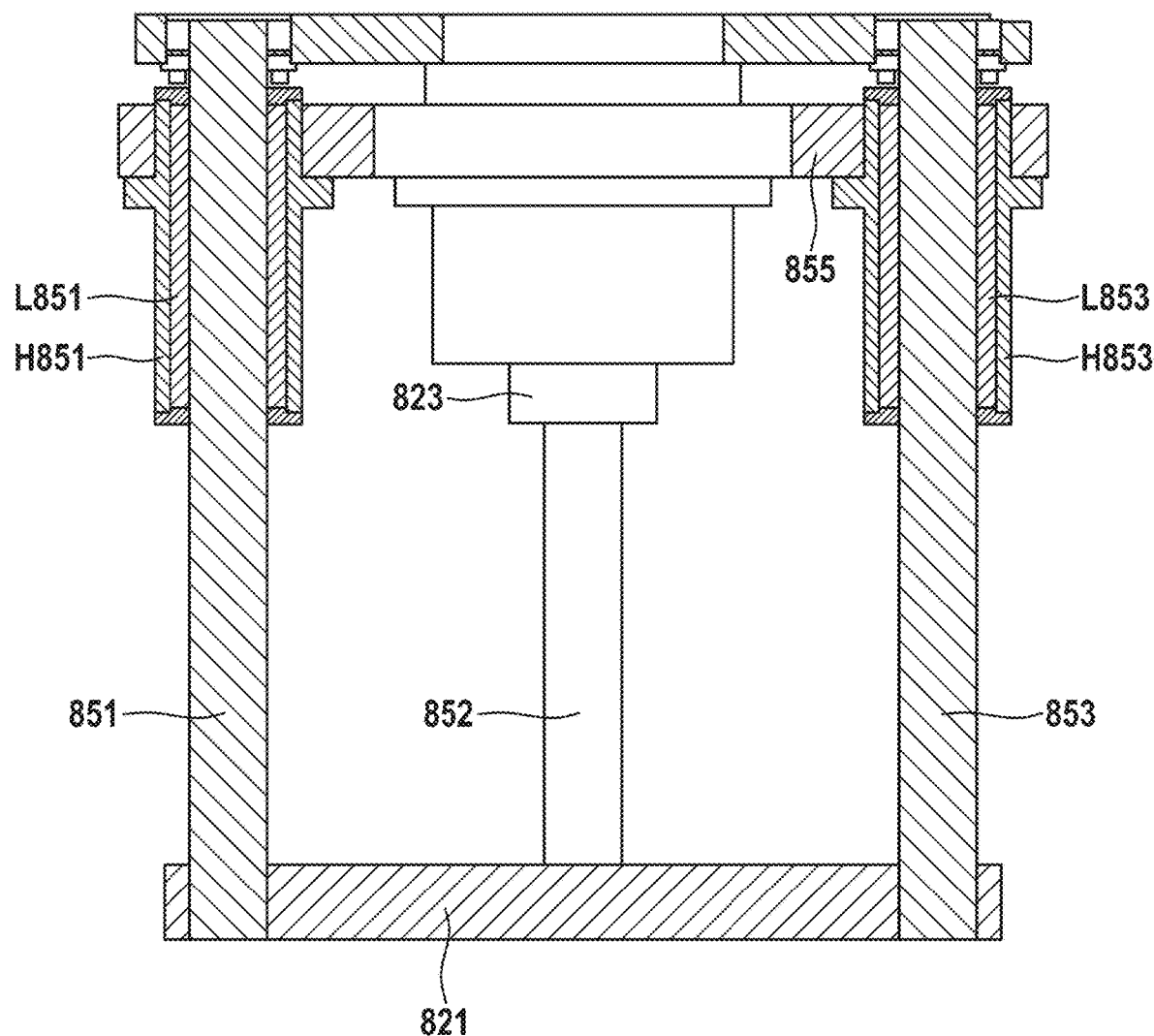
FIG. 26 is a detailed view of a molding station.

The molding station 800 comprises a lower molding unit 801 and an upper molding unit 802 (see FIG. 25), wherein FIG. 25 shows an embodiment of a molding station 800 by means of which for example headlight lenses can be molded in a particularly preferable and appropriate manner. The molding station 800 is an embodiment for the molding station PS from FIG. 24. The molding unit 801 is an embodiment for the lower molding unit PU in FIG. 24, and the molding unit 802 is an embodiment for the upper molding unit PO in FIG. 24. The molding station 800 comprises a molding frame which, in an embodiment by way of example, comprises the interconnected rods 811 and 814, as well as the interconnected rods 812 and 815. The rods 811 and 812 are interconnected by means of a lower plate 817 and an upper connecting part 816, and thus form a molding frame which receives the lower molding unit 801 and the upper molding unit 802.

The lower molding unit 801 comprises a mold drive 840 that corresponds to the actuator U10 and by means of which three rods 841, 842, 843 are displaceable, in order to displace a lower mold 822 coupled to the rods 841, 842, 843, which correspond to the mold UF. The rods 841, 842, 843 are guided through bores or holes (not shown) in the plate 817 and in the plate 821, which prevent or significantly reduce a deviation or movement of the mold 822 in a direction orthogonal to the displacement direction. The rods 841, 842, 843 are embodiments for the displaceable guide rods U51 and U52 according to FIG. 24. The plate 817 is an embodiment or implementation of the fixed guide element UO.

The upper molding unit 802 comprises a mold drive 850 that corresponds to the actuator O10 and is retained by the upper connecting part 816 which corresponds to the fixed connecting piece O11 on the actuator side. By means of the mold drive 850, a plate 855 corresponding to the displaceable guide element O12 is guided by guide rods 851, 852 and 853, and an upper mold 823. The guide rods 851, 852 and 853 correspond to the fixed guide rods OS1 and OS2 in FIG. 24. The mold 823 corresponds to the mold OF in FIG. 24. Furthermore, for the purpose of guidance, sleeves H851, H852 and H853 comprising bearings L851 and L853 are provided as implementations of the recesses of the displaceable guide plate O12 from FIG. 24, which sleeves surround the guide rods 851, 852 and 853. The plates 821 and 817 are fixed to one another, and thus form the fixed guide element UO (plate 817) and the fixed connecting piece O14 on the mold side (plate 821).

Reference sign 870 denotes a displacement mechanism by means of which an induction heater 879 and an induction loop 872 can be displaced towards the lower mold 822 in order to heat said mold by means of the induction loop 872. Following heating by means of the induction loop 872, the induction heater 879 is returned to the starting position thereof. A gob is placed on the mold 822 and is press molded (on both sides) to form a headlight lens, by means of moving the molds 822 and 823 towards one another.

Figure 27:
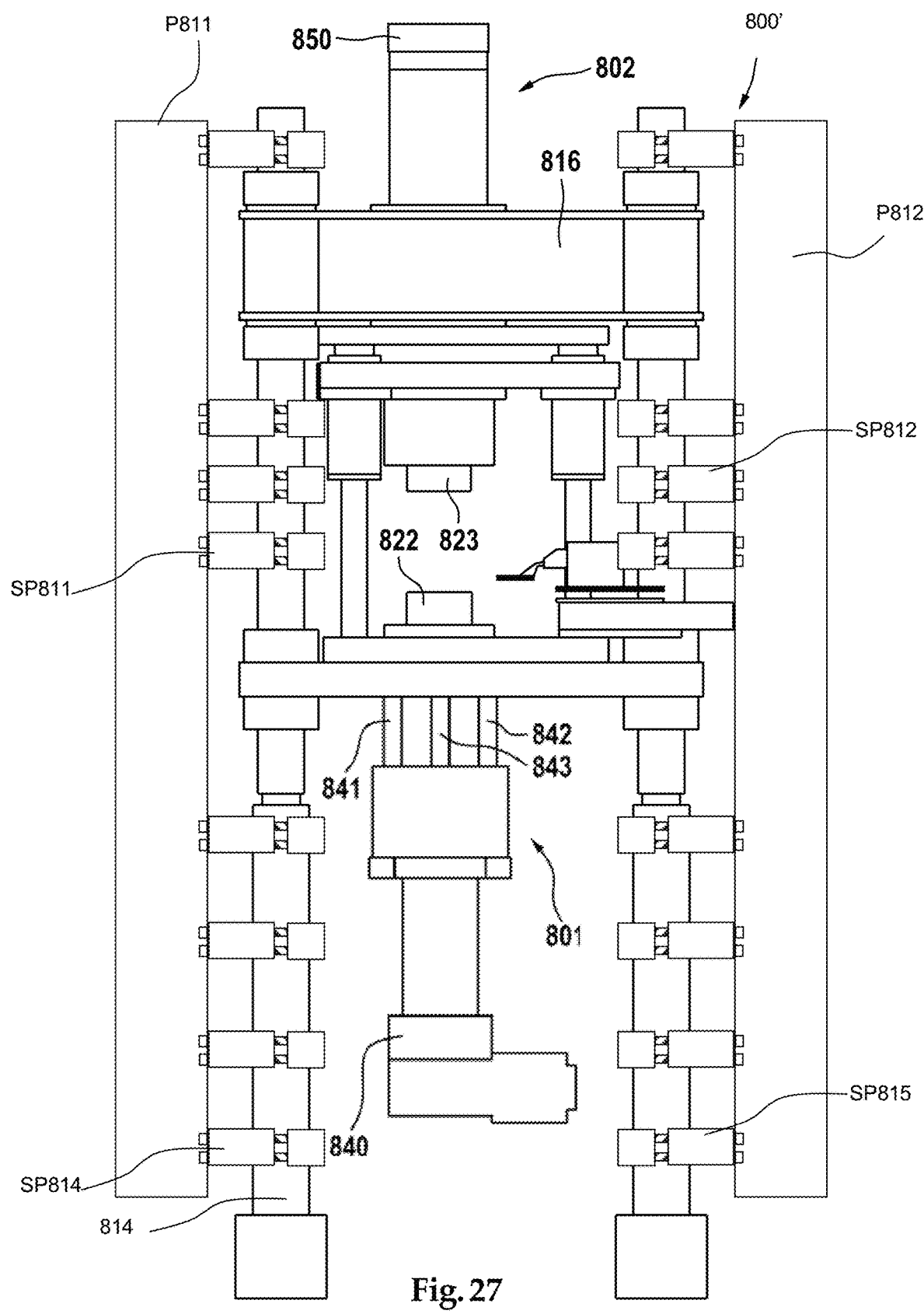
FIG. 27 is a schematic view of a molding station for molding a headlight lens out of a heated blank, which molding station is modified compared with the molding station according to FIG. 24.
Figure 28:
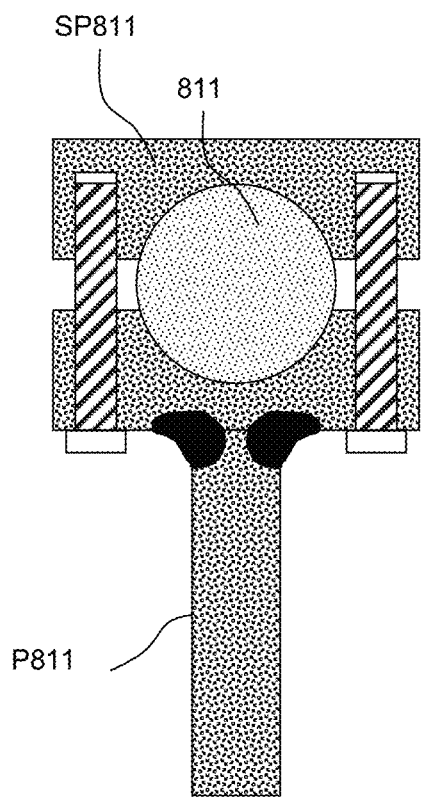
FIG. 28 is a detailed view of the molding station according to FIG. 27.
Figure 29:
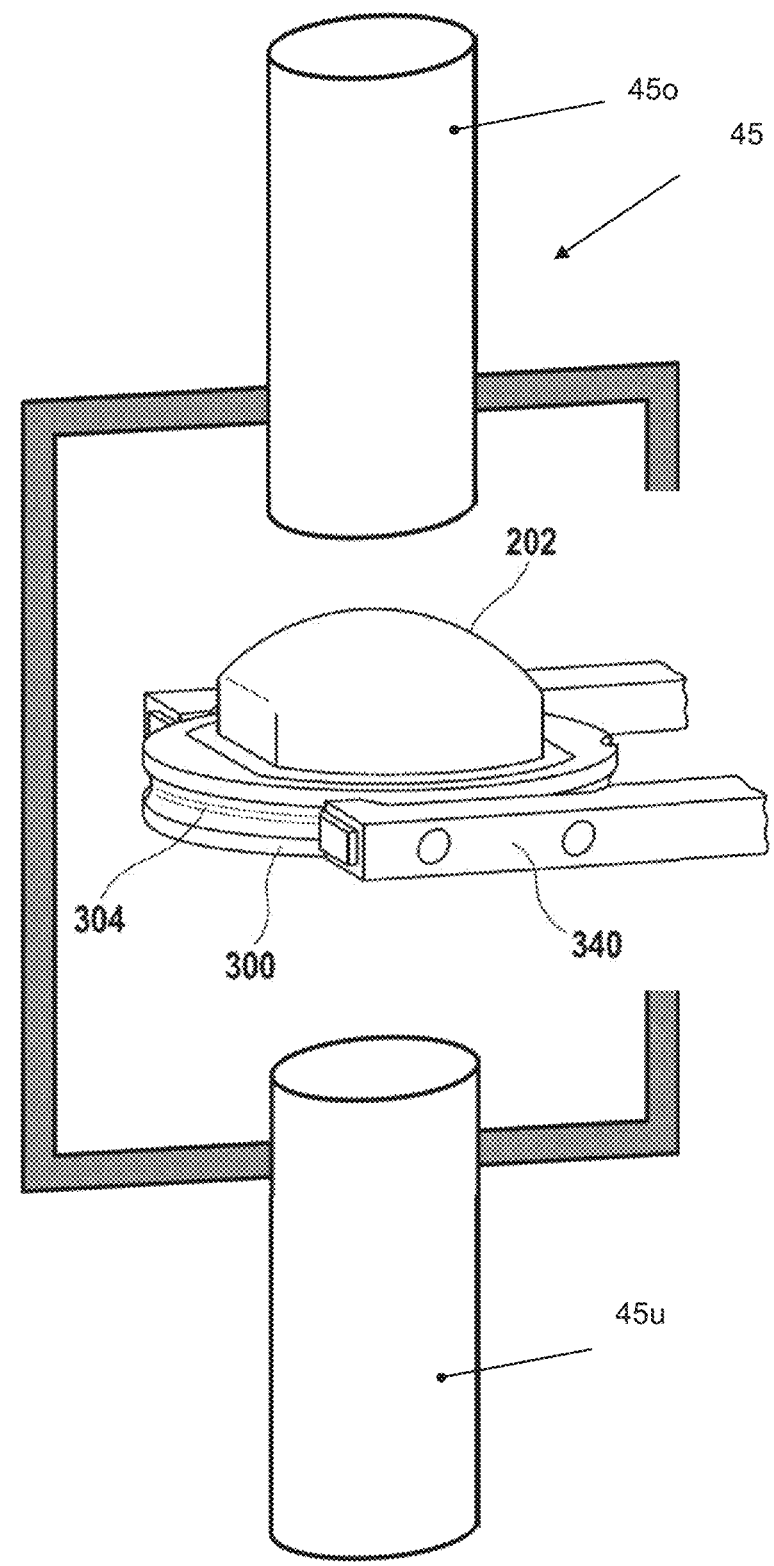
FIG. 29 is a cross-sectional view of an embodiment for a surface treatment station.

FIG. 27 shows a further molding station 800'. In a modification compared with the molding station 800, for example in each case a reinforcement profile P811, P812 for a rod 811, 812 or for a rod 814, 815 is provided, wherein the reinforcement profile P811, P812 is connected to the rods 811, 812, 814, 815 by means of clamps SP811, SP812, SP814, SP815. FIG. 28 is a detailed view of a clamp SP814 of this kind, wherein one half of the clamp is welded to the reinforcement profile.

Figure 7:
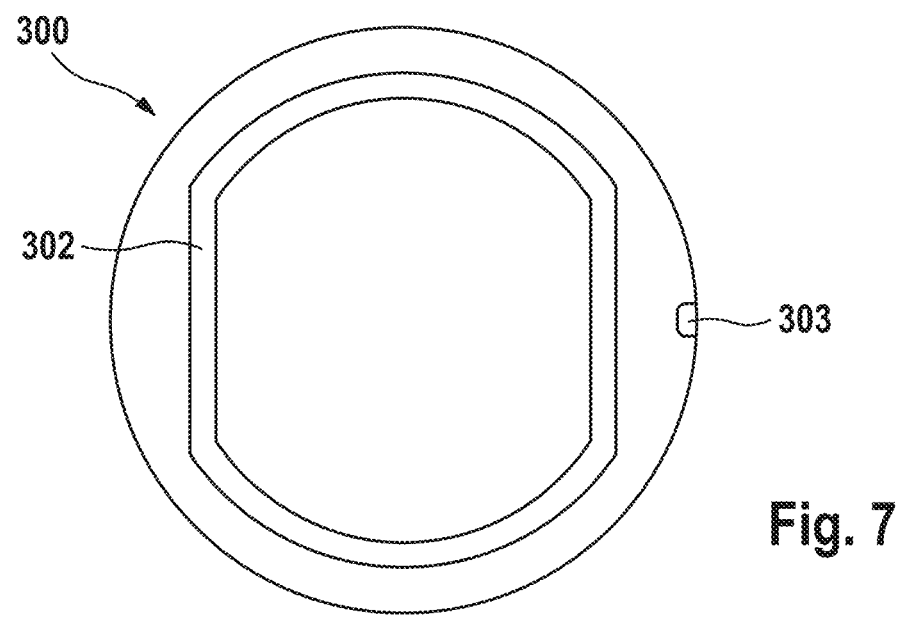
FIG. 7 shows an embodiment for a transport element.
Figure 8:
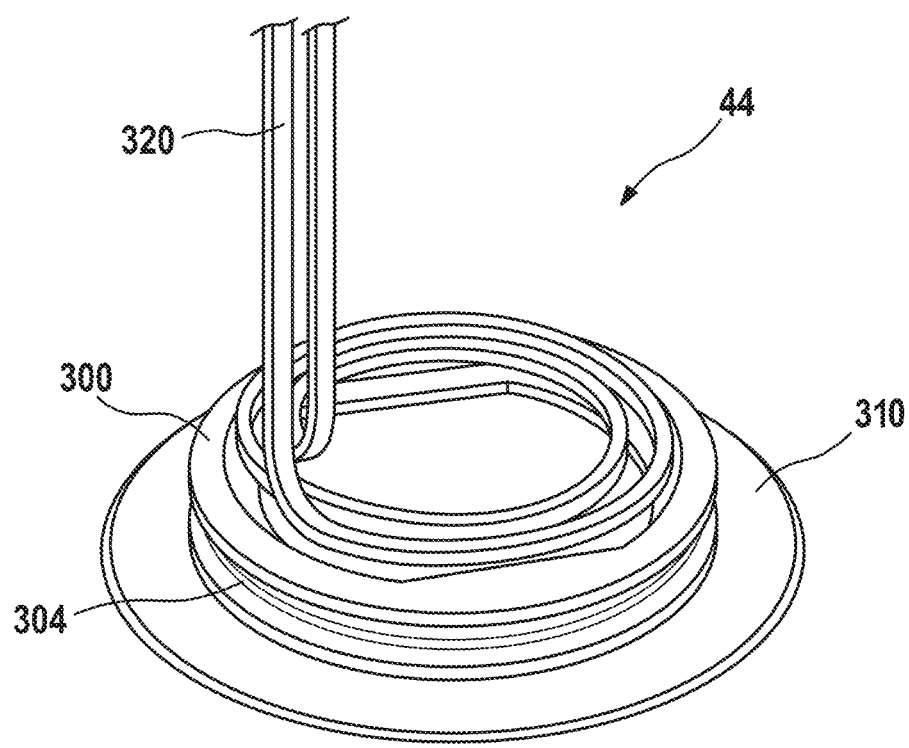
FIG. 8 shows an embodiment for a heating device for a transport element according to FIG. 7.
Figure 10:
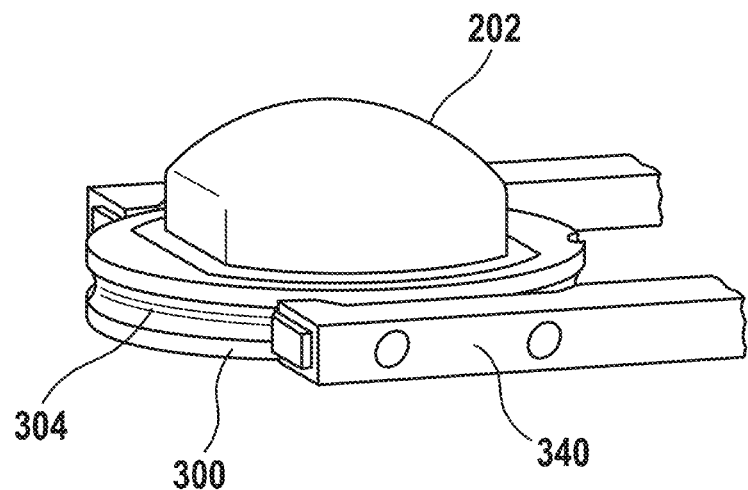
FIG. 10 shows a headlight lens on a transport element according to FIG. 7.
Figure 34:
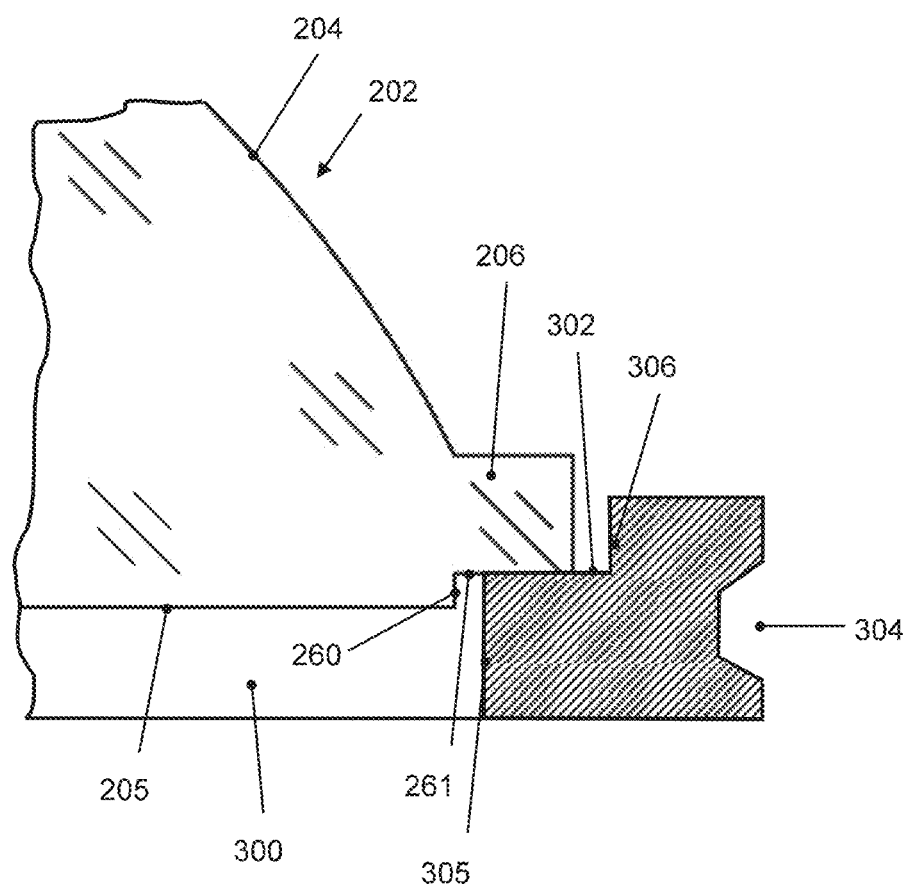
FIG. 34 shows the detail according to FIG. 33, together with a detail of the transport element (in cross section)

Following molding, the headlight lens 202 is placed, by means of a transfer station 9, onto a transport element 300 shown in FIG. 7. The annular transport element 300 shown in FIG. 7 consists of steel, for example ferritic or martensitic steel. On the inside thereof, the annular transport element 300 comprises a (corresponding) contact face 302 on which the edge of the optical element to be cooled, such as the headlight lens 202, is laid, such that damage to the optical surfaces, such as the surface 205, is prevented. Thus, for example the (corresponding) contact face 302 and the contact face 261 of the lens edge 206 come into contact, as is shown for example in FIG. 34. In this case, FIG. 10 and FIG. 34 show the fixing or orientation of the headlight lens 202 on the transport element 300 by means of boundary surface 305 or a boundary surface 306. The boundary surfaces 305 and 306 are for example orthogonal to the (corresponding) contact face 302. In this case, it is intended for the boundary surfaces 305, 306 to have enough clearance, with respect to the headlight lens 202, that the headlight lens 202 can be laid on the transport element 300, for example without the headlight lens 202 canting or jamming on the transport element 300.

FIG. 11 shows a transport element 3000 of an alternative design, which is shown in cross section in FIG. 12. Unless described otherwise, the transport element 3000 is designed so as to be similar or identical or analogous to the transport element 300. The transport element 3000 (likewise) comprises boundary surfaces 3305 and 3306. Furthermore, a contact face 3302 is provided which, however, in a manner deviating from the contact face 302, is designed so as to fall away towards the center point of the transport element 3000. It is intended, for example, for the boundary surfaces 3305 and 3306 to have enough clearance with respect to the headlight lens 202, wherein a particularly precise orientation is achieved by the slant of the contact face 3302. Otherwise, the transport element 3000 is handled in a manner analogous to the following description of the handling of the transport element 300. The angle of the slope or slant of the contact face 3302 relative to the orthogonals of the axis of rotation or, when used as intended, relative to the support plane, is between 5° and 20°, and in the embodiment shown is 10°.

Figure 9:
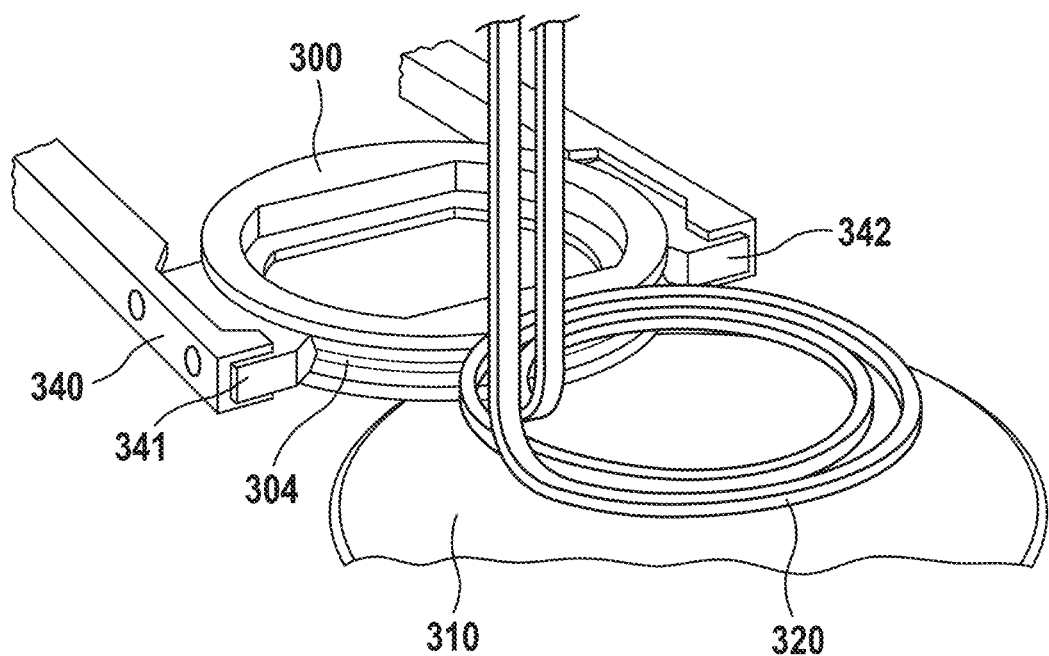
FIG. 9 shows an embodiment for the removal of a transport element according to FIG. 7 from a heating station according to FIG. 8.

Furthermore, prior to the headlight lens 202 being laid on the transport element 300, the transport element 300 is heated, such that the temperature of the transport element 300 is approximately +−50K of the temperature of the headlight lens 202 or of the edge 206. The heating is achieved for example by means of an induction coil 320, as shown in FIG. 9. In this case, the transport element 300 is laid on a support 310 and is heated by means of the induction coil/induction heater 320, for example at a heating rate of 30-50K/s, for example within less than 10 seconds. Subsequently, as shown in FIG. 9 and FIG. 10, the transport element 300 is gripped by a gripper 340. In this case, the transport element 300 for example comprises a constriction 304 at the outer edge thereof, which constriction is designed so as to be peripheral in the embodiment. When correctly oriented, the transport element 300 comprises a marker groove 303. By means of the gripper 340, the transport element 300 is moved towards the molding station 8, and, as shown in FIG. 10, the headlight lens 202 is transferred from the molding station 8 to the transport element 300 and laid thereon.

According to a particularly suitable embodiment, the support 310 is designed as a rotatable plate. As a result, the transport element 300 is placed on the support 310, designed as a rotatable plate, by means of hydraulic and automated movement units (e.g. by means of the gripper 340). Subsequently, centering is carried out by means of two centering jaws 341 and 342 of the gripper 340, specifically such that, as a result of the marker groove 303, which is identified or identifiable by means of a position sensor the transport elements undergo defined orientation. As soon as said transport element 300 has reached the linear end position thereof, the support 340, designed as a rotary plate, begins to rotate until the position sensor has identified the marker groove 303.

In a process step 126, the headlight lens 202 is moved, on the transport element 300, through a surface treatment station 45. In the process, the optically active surface 204 of the headlight lens 202 is sprayed with surface treatment agent using a two-fluid nozzle 45o, and the optically active 205 of the headlight lens 202 is sprayed with surface treatment agent by means of a two-fluid nozzle 45u. The spraying process lasts no longer than 3 seconds, for example for no longer than 2 seconds, for example for no longer than 1 second. The two-fluid nozzles 45o and 45u each comprise an inlet for atomizing air and an inlet for fluid, into which the surface treatment agent is supplied, which agent is converted, by means of the atomizing air, into a mist or spray mist, and emerged through a nozzle. Furthermore, in order to control the two-fluid nozzles 45o and 45u, a control air connection is provided, by means of which the control assembly 15 is actuated.

A weather resistance or hydrolytic resistance that is comparable to borosilicate glass is achieved by means of the method for manufacturing an optical element or a headlight lens. Furthermore, the costs for the manufacturing process are increased only slightly compared with the process for manufacturing optical elements or headlight lenses having a weather resistance or hydrolytic resistance corresponding to silica lime glass.

Figure 13:
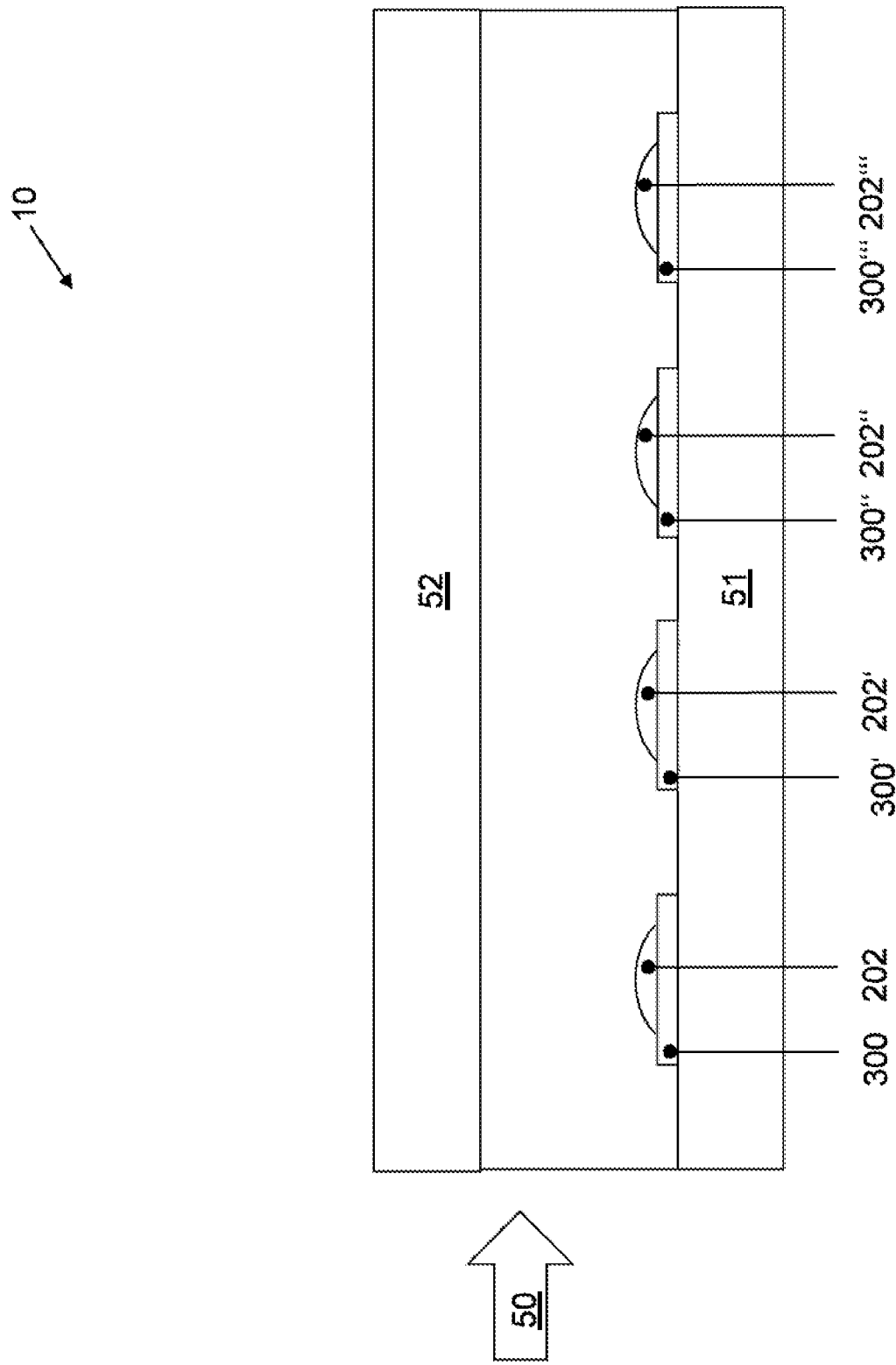
FIG. 13 is a schematic view of an embodiment for a cooling path.

The transport element 300 together with the headlight lens 202 is subsequently placed on the cooling path 10. In a process step 127, the headlight lens 202 is cooled by means of the cooling path 10. FIG. 13 is a detailed schematic view the cooling path 10 from FIG. 1, formed by way of example. The cooling path 10 comprises a tunnel that is heated by means of a heating device 52 and through which the headlight lenses 202, 202', 202'', 202''' are moved slowly, on transport elements 300, 300', 300'', 300''', in a movement direction designated by an arrow 50. In this case, the heating power decreases in the direction of movement of the transport elements 300, 300', 300'', 300''' comprising the headlight lenses 202, 202', 202'', 202'''. In order to move the transport elements 300, 300', 300'', 300''' comprising the headlight lenses 202, 202', 202'', 202''', for example a conveyor belt 51, for example consisting of chain links or implemented as a series of rollers, is provided.

A removal station 11 is provided at the end of the cooling path 10, which station removes the transport element 300, together with the headlight lens 202, from the cooling path 10. Furthermore, the removal station 11 separates the transport element 300 and the headlight lens 202, and transfers the transport element 300 to a return transport means 43. The transport element 300 is transferred from the return transport means 43 to the heating station 44, by means of the transfer station 9, in which heating station the transport element 300 is laid on the support 310 designed as a rotary plate, and is heated by means of the induction heater 320.

Finally, a process step 128 follows, in which, in a washing station 46, residues of the surface treatment agent on the lens are washed off.

The device shown in FIG. 1 furthermore comprises a control assembly 15 for controlling the device 1 shown in FIG. 1. The device 1A shown in FIG. 1A furthermore comprises a control assembly 15A for controlling the device 1A shown in FIG. 1A. The device 1B shown in FIG. 1B furthermore comprises a control assembly 15B for controlling the device 1B shown in FIG. 1B. In this case, the control assembly 15 ensures continuous linkage of the individual process steps. The elements in FIG. 1, FIG. 1A, FIG. 1B, FIG. 5, FIG. 6, FIG. 13, FIG. 24, FIG. 27, FIG. 28, FIG. 29, FIG. 34, FIG. 35, FIG. 38, FIG. 39, FIG. 40 and FIG. 41 are drawn taking account of simplicity and clarity, and are to necessarily true to scale. Thus, for example, the orders of magnitude of some elements are shown exaggerated relative to other elements, in order to improve understanding of the embodiments of the present disclosure.

The method mentioned above provides for an improved manufacturing method for optical elements to be achieved. Furthermore, the costs for the manufacturing process are reduced.

EP 2 104 651 B1 discloses a method for manufacturing headlight lenses for vehicle headlights, wherein a headlight lens comprises a lens body made of glass, having one substantially planar surface and one convexly curved surface, wherein a preform is press molded, between a first mold for molding the convexly curved surface and a second mold for molding the substantially planar surface, comprising a first partial mold and an annular second partial mold that surrounds the first partial mold, to form a headlight lens having a lens edge that is molded on, wherein a step is molded into the headlight lens by means of an offset, dependent on the volume of the preform, between the second partial mold and the first partial mold, and wherein the first partial mold is offset, relative to the second partial mold, at least in the region of the offset.

WO 2007/095895 A1 describes a method for press molding a motor vehicle headlight lens or a lens-like freeform for a motor vehicle headlight, wherein a preform is manufactured from glass, wherein the temperature gradient of the preform is inverted, and wherein subsequently the motor vehicle headlight lens or the lens-like freeform for a motor vehicle headlight is molded from the preform.

DE 112008003157 B4 discloses controlled cooling of injection-molded headlight lenses comprising a lug, in a cooling-path, while adding heat, wherein the cooling path comprises rollers on which the headlight lenses are moved slowly through the cooling path. Following cooling, the lug is removed.

The invention claimed is:

1. A method for manufacturing an optical element out of glass, the method comprising:
providing a supporting body having a contact face;
providing a furnace having a furnace cavity;
providing a protective cap having a protective cap cavity;
releasably arranging the protective cap in the furnace cavity;
providing a blank made of glass;
placing the blank on the contact face of the supporting body;
thereafter introducing the blank on the contact face into the protective cap cavity;
thereafter closing the protective cap cavity at least in part;
thereafter heating the blank in the protective cap cavity such that the blank has a lower temperature on the inside than at the edge;
thereafter opening the protective cap cavity;
thereafter removing the supporting body, together with the blank resting on the contact face, from the furnace; and
thereafter press molding the blank to form the optical element.

2. The method according to claim 1, wherein the protective cap is removed from the furnace cavity after bursting of the blank and another protective cap is fixed in the furnace.

3. The method according to claim 1, wherein the first heating coil comprises at least one winding.

4. The method according to claim 1, wherein the cavity in the protective cap comprises a downwardly oriented opening, wherein the blank is introduced into the cavity of the protective cap from below.

5. The method according to claim 4, wherein the furnace cavity comprises at least one first heating coil which surrounds the protective cap in the furnace cavity at least in part, such that the inside of the protective cap is heated by means of the first heating coil.

6. The method according to claim 5, wherein the furnace cavity comprises at least one second heating coil which surrounds the protective cap in the furnace cavity at least in part, such that the inside of the protective cap is heated by means of the second heating coil.

7. The method according to claim 6, wherein the first heating coil is driven independently of the second heating coil.

8. The method according to claim 6, wherein the at least second heating coil comprises at least one winding.

9. The method according to claim 1, wherein the furnace cavity comprises at least one first heating coil which surrounds the protective cap in the furnace cavity at least in part, such that the inside of the protective cap is heated by means of the first heating coil.

10. The method according to claim 9, wherein the furnace cavity comprises at least one second heating coil which surrounds the protective cap in the furnace cavity at least in part, such that the inside of the protective cap is heated by means of the second heating coil.

11. The method according to claim 10, wherein the first heating coil is driven independently of the second heating coil.

12. The method according to claim 11, wherein the at least first heating coil and the at least second heating coil are controlled in a manner to achieve a homogeneous temperature distribution in the cavity of the protective cap.

13. The method according to claim 12, following press molding, further comprising:
transferring the optical element to a transport element; and
subsequently placing the transport element, together with the optical element, onto a cooling path, such that there is no contact with any optically active surface of the optical element.

14. A method for manufacturing a vehicle headlight, the method comprising:
providing a light source;
manufacturing an optical element out of glass, the method for manufacturing the optical element comprising:
providing a blank made of glass;
placing the blank on a contact face of a supporting body;
thereafter introducing the blank on the contact face into a cavity of a protective cap, wherein the protective cap is releasably arranged in a furnace cavity of a furnace, wherein the furnace cavity comprises at least one first heating coil which surrounds the protective cap in the furnace cavity at least in part, such that the inside of the protective cap is heated by means of the first heating coil;
thereafter heating the blank in the cavity of the protective cap such that the blank has inside a lower temperature than at the surface;
thereafter removing the supporting body, together with the blank resting on the contact face, from the furnace;
subsequently press molding the blank to form the optical element comprising a light entry surface and a light exit surface; and
cooling the optical element by supplying heat; and
arranging the optical element together with the light source such that light from the light source can be emitted into the light entry surface of the optical element.

15. The method according to claim 14, wherein the protective cap is removed from the furnace cavity after bursting of the blank and another protective cap is fixed in the furnace.

16. The method according to claim 14, wherein the cavity in the protective cap comprises a downwardly oriented opening, wherein the blank is introduced into the cavity of the protective cap from below.

17. The method according to claim 14, wherein the furnace cavity comprises at least one second heating coil which surrounds the protective cap in the furnace cavity at least in part, such that the inside of the protective cap is heated by means of the second heating coil, wherein the first heating coil is driven independently of the second heating coil.

18. The method according to claim 14, wherein the at least first heating coil and the at least second heating coil are actuated in order to achieve a homogeneous temperature distribution in the cavity of the protective cap.

19. A method for manufacturing a vehicle headlight, the method comprising:
providing a light source;
providing primary optics;
manufacturing an optical element out of glass, the method for manufacturing the optical element comprising:
providing a blank made of glass;
placing the blank on a contact face of a supporting body;
subsequently introducing the blank on the contact face into a cavity of a protective cap, wherein the protective cap is releasably arranged in a furnace cavity;
thereafter heating the blank in the cavity of the protective cap such that the blank has a lower temperature on the inside than at the edge;
thereafter removing the supporting body, together with the blank resting on the contact face, from the furnace;
subsequently press molding the blank to form the optical element comprising a light entry surface and a convex light exit surface; and
cooling the optical element and while supplying heat;
installing the optical element as a lens in a multilens objective;
installing the multilens objective together with the light source and the primary optics for generating an illumination pattern by orienting light of the light source, wherein the multilens objective is oriented such that it projects the illumination pattern.

20. The method according to claim 19, wherein the furnace cavity comprises at least one first heating coil which surrounds the protective cap in the furnace cavity at least in part, such that the inside of the protective cap is heated by means of the first heating coil.

21. The method according to claim 20, wherein the furnace cavity comprises at least one second heating coil which surrounds the protective cap in the furnace cavity at least in part, such that the inside of the protective cap is heated by means of the second heating coil, wherein the first heating coil is actuated independently of the second heating coil.

* * * * *